United States Patent [19]
Forbes et al.

[11] Patent Number: 4,712,035
[45] Date of Patent: Dec. 8, 1987

[54] SALIENT POLE CORE AND SALIENT POLE ELECTRONICALLY COMMUTATED MOTOR

[75] Inventors: Franklin L. Forbes; Harold B. Harms, both of Fort Wayne, Ind.

[73] Assignee: General Electric Company, Fort Wayne, Ind.

[21] Appl. No.: 796,779

[22] Filed: Nov. 12, 1985

[51] Int. Cl.[4] .......................................... H02K 15/02
[52] U.S. Cl. ................................. 310/269; 29/596; 310/67 R; 310/218
[58] Field of Search ............... 29/596; 310/42, 43, 310/67 R, 216, 217, 218, 268, 269, 156

[56] References Cited

U.S. PATENT DOCUMENTS

| | | | |
|---|---|---|---|
| 687,991 | 12/1901 | Churchward | 310/218 |
| 2,212,872 | 8/1940 | Barker | 74/70 |
| 2,656,699 | 10/1953 | Chapin | 68/23 |
| 2,669,856 | 2/1954 | Williams | 68/12 |
| 2,736,829 | 2/1956 | Sills | 310/269 |
| 3,184,933 | 5/1965 | Gaugler | 68/23 |
| 3,194,032 | 7/1965 | Von Brimer | 68/23 |
| 3,216,226 | 11/1965 | Alger et al. | 68/23 |
| 3,216,227 | 11/1965 | Alger et al. | 68/23 |
| 3,279,223 | 10/1966 | Severance et al. | 68/12 |
| 3,358,381 | 12/1967 | Sowa et al. | 34/58 |
| 3,503,228 | 3/1970 | Lake | 68/12 |
| 3,597,777 | 8/1971 | Douglas | 8/159 |
| 3,634,873 | 1/1972 | Nishimura | 318/254 |
| 3,840,764 | 10/1974 | Burger | 310/185 |
| 4,115,715 | 9/1978 | Müller | 310/67 R |
| 4,155,021 | 5/1979 | Corbach et al. | 310/154 |
| 4,232,536 | 11/1980 | Koseki et al. | 68/12 |
| 4,311,933 | 1/1982 | Riggs et al. | 310/67 R |
| 4,395,815 | 8/1983 | Stanley et al. | 29/596 |
| 4,438,558 | 3/1984 | Mitsui | 29/732 |
| 4,446,706 | 5/1984 | Hartwig | 68/24 |
| 4,495,450 | 1/1985 | Tokizaki et al. | 318/138 |
| 4,528,485 | 7/1985 | Boyd, Jr. | 318/138 |

FOREIGN PATENT DOCUMENTS 0137865 10/1979 Japan .
2127136 4/1984 United Kingdom .

*Primary Examiner*—Peter S. Wong
*Assistant Examiner*—D. L. Rebsch
*Attorney, Agent, or Firm*—Ralph E. Krisher, Jr.

[57] ABSTRACT

An inside-out salient pole core for a dynamo-electric machine. The core has an edgewise wound yoke including an edgewise and helically wound strip of generally thin ferromagnetic material having at least one edge defining an outer circumferential surface on the edgewise wound yoke and extending generally axially thereacross. A set of salient pole pieces is secured to the edgewise wound core at least generally adjacent its outer circumferential surface, and extends generally outwardly from the outer circumferential surface about a set of preselected pitch axes, respectively.

40 Claims, 29 Drawing Figures

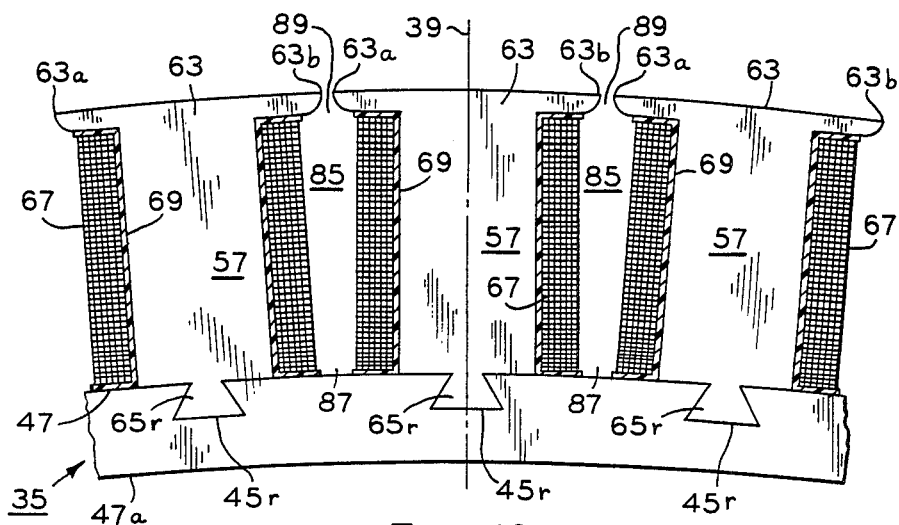
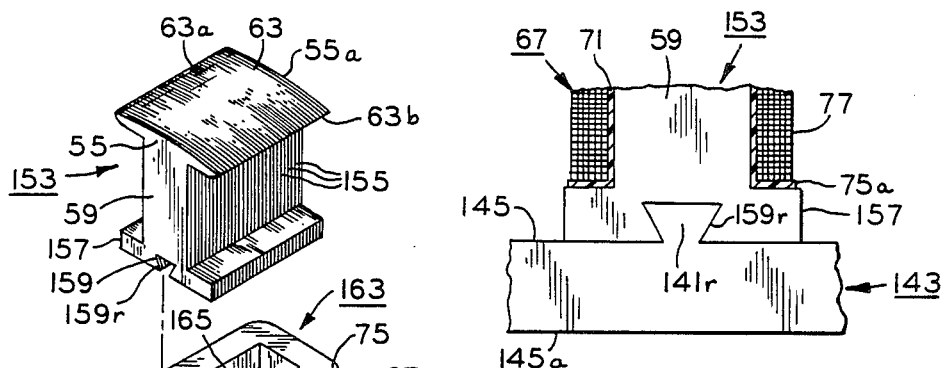
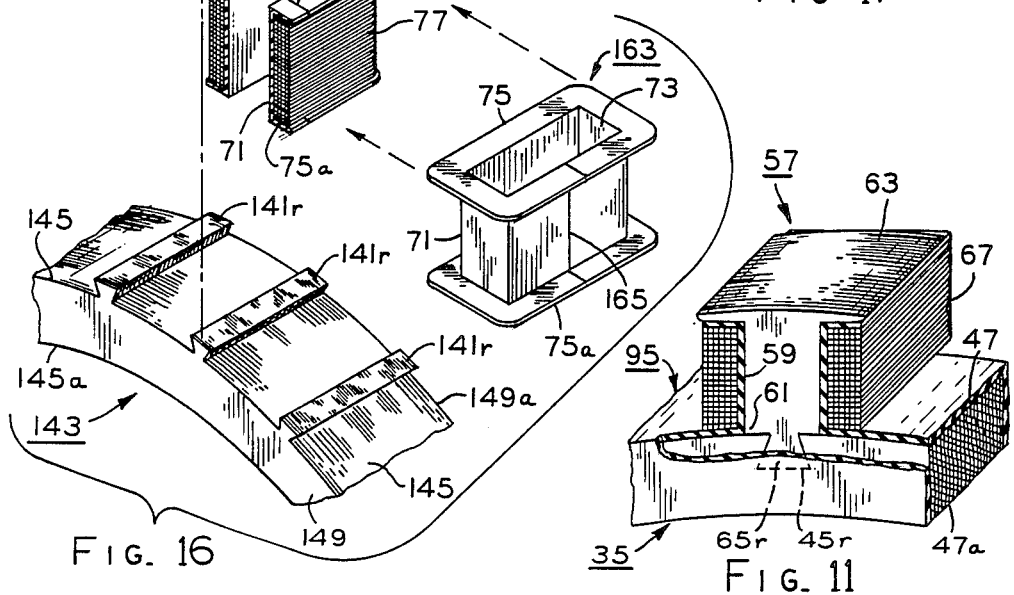

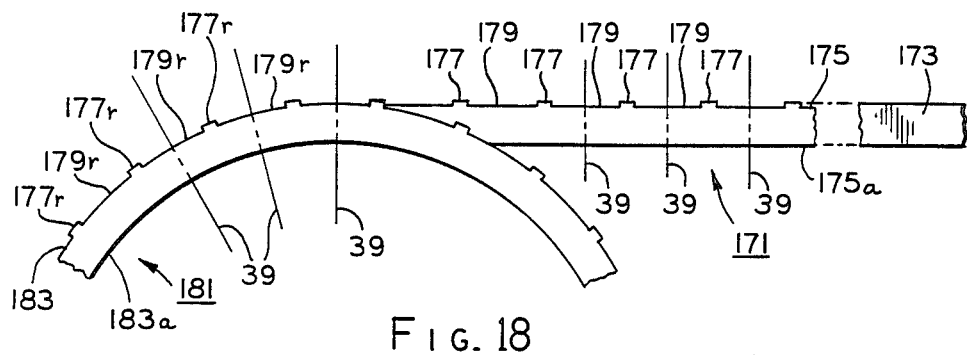
FIG. 18
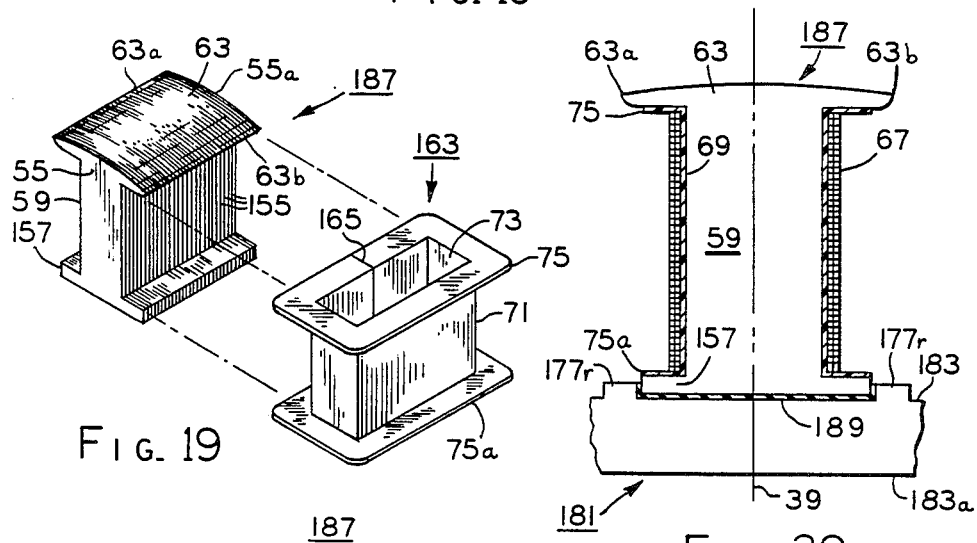
FIG. 19
FIG. 20
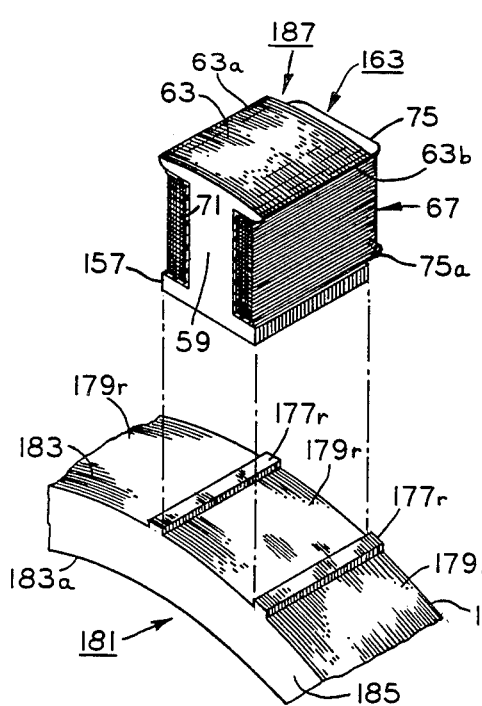
FIG. 21

SALIENT POLE CORE AND SALIENT POLE ELECTRONICALLY COMMUTATED MOTOR

FIELD OF THE INVENTION

This invention relates in general to dynamoelectric machines and in particular to a salient pole electronically commutated motor and a salient pole core.

BACKGROUND OF THE DISCLOSURE

In the past, various different types of motors have been employed to drive laundry machines or laundering apparatus. In one of these past driving schemes, it is believed that a conventional DC motor was utilized to drive the laundering apparatus through either a conventional differential thereof or through a conventional gear reduction device. Commutation of such past conventional DC motor was effected by brushes riding on a segmented commutator so as to control the currents flowing through the armature winding sections of such past conventional DC motor. Of course, one of the disadvantageous or undesirable features attendant to the above discussed commutated DC motor is believed to be that wear of the brushes riding on the segmented commutator necessitated frequent brush replacement. Other disadvantageous or undesirable features of such past commutated DC motor are believed to be that sparking may have occurred between the brushes and the segmented commutator thereof which not only may have effected RF interfernce, but also may have limited the use of such past communated DC motors in some critical areas or particular environmental applications. A yet further disadvantageous or undesirable feature associated with such past laundering apparatus is believed to be that it was necessary to employ a differential or gear reduction device with such past conventional DC motor to effect the operation of such laundering apparatus, since it is believed that such differential or gear reduction device not only added cost to such laundering apparatus but also might need repair or replacement during the life of such laundering apparatus.

Various circuit and motor schemes have been utilized to develop various types of brushless DC motors or electronically commutated motors, and one such scheme is shown in the David M. Erdman U.S. Pat. Nos. 4,005,347 issued Jan. 25, 1977 and 4,015,182 issued Mar. 29, 1977, each of which are incorporated herein by reference. In these patents, an electronically commutated motor has a stator and a multistage winding arrangement associated therewith including a set of winding stages, a rotor having a set of constant magnetic polar regions, and means for sensing the relative positions of the rotor polar regions with respect to the stator. Positive signals developed by the position sensing means were processed by circuitry for selectively energizing or electronically commutating the windings of such electronically commutated motor. The use of the above discussed circuitry and electronically commutated motor in a laundering device driving it through a gear reduction device is disclosed in U.S. Pat. No. 4,327,302 issued Apr. 27, 1982 to Doran D. Hershberger which is also incorporated herein by reference.

SUMMARY OF THE INVENTION

Among the several objects of the invention may be noted the provision of an improved salient pole electronically commutated motor and an improved salient pole core which at least in part overcome at least some of the above discussed disadvantageous or undesirable features, as well as others, of the prior art; the provision of such improved salient pole electronically commutated motor and salient pole core which are of a compact size and yet provide a comparatively large output rating; the provision of such improved salient pole electronically commutated motor and salient pole core in which the formation of the components thereof is virtually scrapless; the provision of such improved salient pole electronically commutated motor and salient pole core in which a yoke or component thereof is edgewise wound and a set of salient pole pieces or salient pole piece components thereof are each stacked laminations secured together; the provision of such improved salient pole electronically commutated motor and salient pole core in which the salient pole pieces are secured to the edgewise wound core at least generally adjacent an outer circumferential surface thereof; and the provision of such improved salient pole electronically commutated motor and salient pole core in which the component parts utilized therein are simple in design, easily assembled and economically manufactured. These as well as other objects and advantageous features of the present invention will be in part apparent and in part pointed out hereinafter.

In one form of the invention, a salient pole core for a dynamoelectric machine is provided with an edgewise wound yoke including an edgewise and helically wound strip of generally thin ferromagnetic material having at least one edge defining an outer circumferential surface on the edgewise wound yoke and extending generally axially thereacross. A set of salient pole pieces are secured to the edgewise wound yoke at least generally adjacent its outer circumferential surface and extend therefrom about a set of preselected pitch axes, respectively.

Also in general and in one form of the invention, a salient pole electronically commutated motor is provided with an edgewise wound yoke including an edgewise and helically wound strip of generally thin ferromagnetic material having at least one edge thereon defining an outer circumferential surface on the edgewise wound yoke extending generally axially thereacross. A set of salient pole pieces are secured to the edgewise wound yoke at least generally adjacent its outer circumferential surface and extend outwardly therefrom about a set of preselected pitch axes, respectively. A multistage winding arrangement includes a set of concentrated winding stages associated with the salient pole pieces and adapted to be electronically commutated in at least one preselected sequence, respectively. Permanent magnet rotor means is arranged generally circumferentially about the salient pole pieces and is associated in selective magnetic coupling relation with the concentrated winding stages for driven rotation upon the electronic commutation of at least some of the winding stages in the at least one preselected sequence, respectively.

BRIEF DESCRIPTION OF THE DRAWINGS

FIG. 10 is an enlarged partial sectional view taken from FIG. 1 and illustrating the passage of concentrated winding stages through adjacent winding receiving slots between adjacent salient pole pieces with which the concentrated winding stages are associated on the yoke section, respectively;

FIG. 11 is a partial perspective sectional view showing an integral insulation system associated with the salient pole pieces and the yoke section to electrically insulate therefrom the concentrated winding stages thereby to illustrate another alternative inside-out salient pole electronically commutated motor in one form of the invention and an alternative method of fabricating a core, respectively;

FIG. 16 is an exploded partial perspective view showing the yoke section of FIG. 15, an alternative salient pole piece and a wound insulation bobbin as may be utilized in an alternative construction of a salient pole electronically commutated motor in one form of the invention;

FIG. 17 is an enlarged partial elevational view taken from FIG. 16 illustrating the displacement preventing engagement of one of the extensions on the outer circumferential surface of the alternative yoke section received within the notch row therefor in the alternative salient pole piece;

FIG. 18 is a partial front elevational view of another alternative yoke section of an alternative salient pole core in one form of the invention as edgewise wound from a lanced strip of generally thin ferromagnetic material and illustrates principles which may be employed in an alternative method of fabricating a salient pole electronically commutated motor;

FIG. 19 is an exploded perspective view showing another alternative salient pole piece and a split insulation bobbin therefor and illustrating principles which may be practiced in another alternative method of fabricating a salient pole electronically commutated motor;

FIG. 20 is a partial sectional view illustrating the winding of turns of an insulated conductor on the split insulation bobbin disposed about the alternative pole piece of FIG. 19;

FIG. 21 is an exploded partial perspective view of the wound salient pole piece of FIG. 20 disposed for mounting relation with an outer circumferential surface of the yoke section of FIG. 18 thereby to illustrate another alternative salient pole electronically commutated motor in one form of the invention;

Corresponding reference characters refer to corresponding parts throughout the several views of the drawings.

Figure 1:
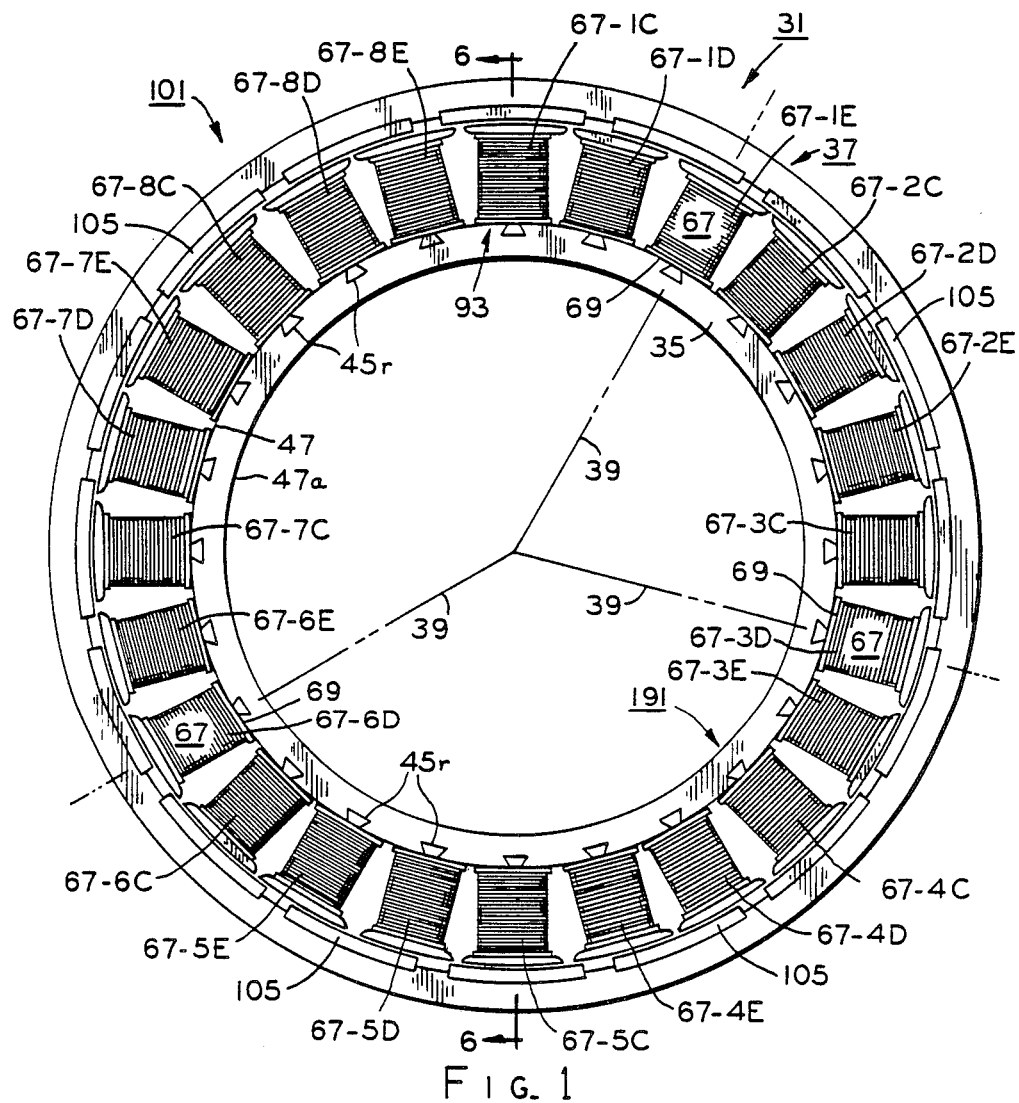
FIG. 1 is a front elevational view of an inside-out salient pole electronically commutated motor in one form of the invention.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

With reference to the drawings in general, there is illustrated a method for fabricating a salient pole electronically commutated motor (hereinafter sometimes referred to as ECM) 31 with the salient pole electronically commutated motor including a lanced strip 33 of generally thin ferromagnetic material (FIGS. 1-10). Lanced strip 33 is formed or generally edgewise and helically wound into a generally annular edgewise wound yoke or yoke section 35 for salient pole electronically commutated motor 31 (FIGS. 1, 2, 5 and 6), and a set of salient poles 37 are formed or otherwise established on the edgewise wound yoke section being disposed about a set of preselected pitch axes 39 so as to extend generally outwardly from the edgewise wound yoke section, respectively (FIGS. 1 and 3-7).

Figure 2:
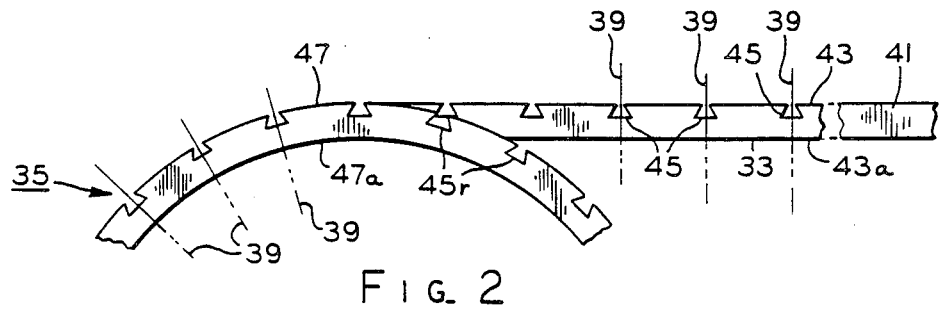
FIG. 2 is an enlarged partial view taken from FIG. 1 showing a yoke section of a salient pole core in one form of the invention for the inside-out salient pole electronically commutated motor as edgewise wound from a lanced strip of generally thin ferromagnetic material and illustrating principles which may be practiced in a method of fabricating a salient pole electronically commutated motor.

More particularly and with specific reference to FIG. 2, lanced strip 35 may be lanced, punched or otherwise formed by suitable means well known to the art, such as a progressive die set (not shown) or the like for instance, from strip stock 41 of generally thin ferromagnetic material having desired electrical and magnetic characteristics and the physical properties desirable to enhance the edgewise winding of the lanced strip. A pair of generally opposite edges 43, 43a are provided on lanced strip 33 extending generally lengthwise thereof, and a set or plurality of predeterminately spaced apart notches 45 are provided in opposite edge 43 of the lanced strip spanning pitch axes 39, respectively.

Lanced strip 33 is edgewise deformed or wound into a plurality of generally helical convolutions thereof which are accumulated in a generally loose wound annular stack defining yoke section 35 having a preselected axial length or stack height. Thus, opposite edges 43, 43a on deformed lanced strip 33 of edgewise wound yoke section 35 define a pair of generally radially spaced apart outer and inner circumferential surfaces 47, 47a thereof, and the outer and inner circumferential surfaces extend generally axially across the yoke section between a pair of generally axially spaced apart opposite end faces 49, 49a thereof, which define the aforementioned axial length of the yoke section, respectively. Of course, the leading and trailing end portions of edgewise deformed lanced strip 33 in edgewise wound yoke section 35 are generally flat and arranged generally in parallel spaced apart relation so as to define opposite end faces 49, 49a thereof, respectively. Further, pitch axes 39 and notches 45 in opposite edge 43 of deformed lanced strip 33 in yoke section 35 are generally radially spaced apart, and the notches are arranged or aligned generally in a set or plurality of rows or row formations 45r thereof to define grooves or groove means in outer circumferential surface 47 of the yoke section extending transversely or generally axially thereacross between opposite end faces 49, 49a of the yoke section, respectively. Of course, the loose wound helical convolutions of deformed lanced strip 33 in yoke section 35 are easily adjustable or positioned one to another thereof, and such adjusting or positioning may be accomplished by associating the yoke section with an alignment fixture or arbor, as well known in the art, to effect the desired aligned configuration of the yoke section with notch rows 45r and outer and inner circumferential surfaces 47, 47a being aligned generally axially across the yoke section between opposite end faces 49, 49a thereof; however, for tne sake of brevity of disclosure and drawing simplification, the association of the yoke section with such an alignment arbor is omitted. If a more detailed discussion of the edgewise winding of a lanced strip into an edgewise wound core and/or apparatus for accomplishing such is desired, reference may be had to the commonly assigned U.S. patent application of Harold L. Fritzsche, Ser. No. 660,211 filed Oct. 12, 1984 which is incorporated herein by reference.

Figure 3:
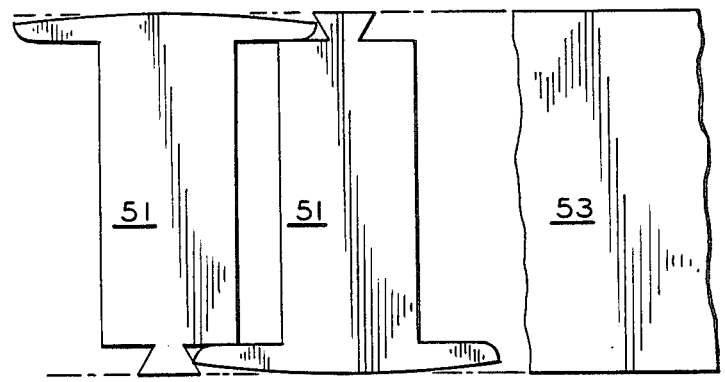
FIG. 3 is a front elevational view showing the lancing of salient pole piece laminations from strip stock of generally thin ferromagnetic material.
Figure 4:
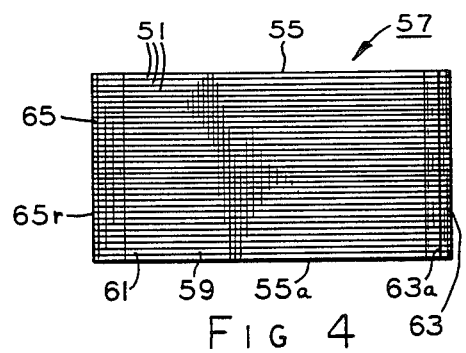
FIG. 4 is a side elevational view of a generally axial stack of the laminations of FIG. 3 secured together generally in face-to-face relation thereby to define a salient pole piece for the inside-out salient pole electronically commutated motor of FIG. 1.

As best seen in FIGS. 3 and 4, a plurality of salient pole piece laminations 51 may be lanced, punched or otherwise formed by suitable means well known to the art, such as a progressive die set (not shown) or the like for instance, from strip stock 53 of generally thin ferromagnetic material having desired electrical and magnetic properties, and a pair of opposite faces or surfaces 55, 55a on the strip stock, of course, define opposite faces or surfaces on the salient pole piece laminations or ferromagnetic material laminations. Subsequent to the lancing of salient pole piece laminations 51 from strip stock 53, the salient pole piece laminations may be arranged or otherwise associated generally in surface-to-surface or interfering relation in a plurality of generally axial stacks thereof and secured together in such stacks by suitable means well known to the art, such as laser welding or the like for instance, thereby to form or define a set of salient pole pieces or salient pole teeth 57 for ECM 31, respectively. It may be noted that the length or axial stack height of salient pole pieces 57 may at least correspond to the axial length of yoke section 35 between opposite end faces 49, 49a thereof.

Upon the formation of salient pole pieces 57 from salient pole piece lamination 51, as discussed above, the salient pole pieces each include an intermediate or winding receiving section 59 integrally interposed between a base or root section 61 and a generally arcuate tip section 63 which has a pair of opposite tip ends or end portions 63a, 63b extending generally laterally beyond the intermediate section, and the intermediate, base and tip sections are interposed between a pair of opposite end faces on each salient pole piece defined by opposite faces 55, 55a of the opposite end salient pole piece laminations thereof, respectively. Salient pole piece laminations 51 in each salient pole piece 57 are also provided with integral extensions or extension means 65 extending from base section 61 thereof and arranged in row formation transversely across the salient pole piece between opposite end faces 55, 55a thereof to define a projection or an extension row or row formation 65r on the salient pole piece. As is apparent from FIGS. 3 and 5, the width of tip section 86 between tip ends 63a, 63b is substantially greater than the widths of either winding receiving section 59 or base section 61. Of course, the formation or assembly of salient pole pieces 57, as discussed above, may occur either prior or subsequent to the edgewise winding of lanced strip 33 into yoke section 35 or generally concurrently therewith.

Figure 5:
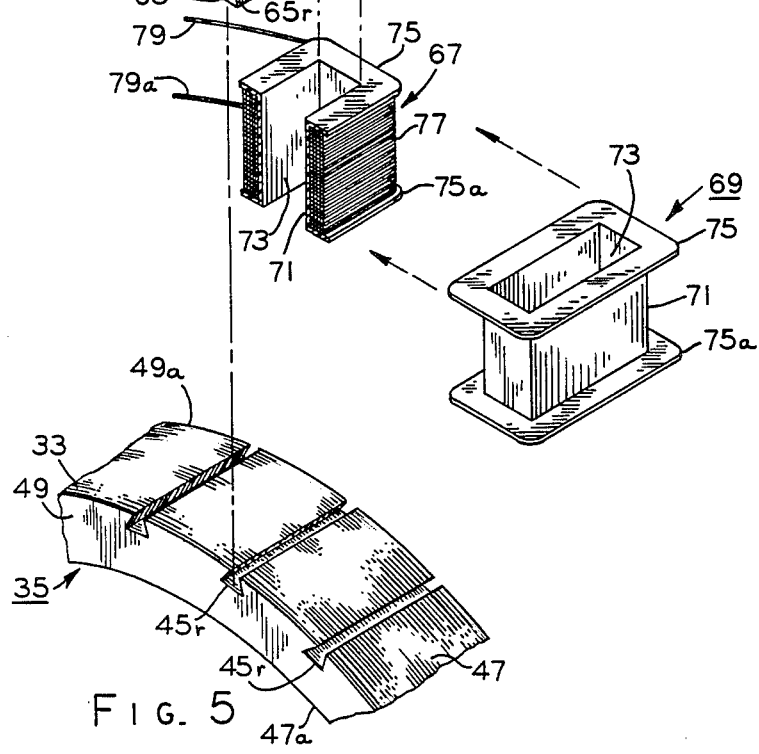
FIG. 5 is an enlarged partial exploded view taken from FIG. 1 showing in perspective a part of the yoke section, one of the salient pole pieces, and one wound insulation bobbin in cross section of the inside-out salient pole electronically commutated motor of FIG. 1.

Either prior or subsequent to the formation or assembly of yoke section 35 and salient pole pieces 57 or substantially simultaneously therewith, a set or plurality of concentrated windings or winding means 67 for ECM 31 may be wound or formed on a set or plurality of insulating means, such as for instance integral bobbins 69 or the like of suitable electrical insulation material, for containing or supporting the windings, respectively, as best seen in FIG. 5. Bobbins 69 each have a sleeve 71 defining an opening 73 therethrough, and a pair of spaced apart opposite flanges 75, 75a are integrally provided on the sleeve extending generally radially outwardly thereof, respectively. A preselected number of conductor turns of an insulated conductor 77, such as magnet wire or the like as well known to the art, is randomly or layer wound about sleeve 71 of bobbin 69 between opposite flanges 75, 75a thereof so as to form a concentrated winding 67, and a pair of opposite ends or end portions 79, 79a of the insulated conductor may be arranged or extended from the concentrated winding wound on the bobbin for connection in circuit relation, as discussed in greater detail hereinafter. While only opposite ends 79, 79a of concentrated windings 67 are illustrated herein for purposes of disclosure as being brought out from the concentrated windings, it is contemplated that such concentrated windings may have at least one tapped section with tap connections or leads thereof also being brought out from the concentrated windings within the scope of the invention so as to meet at least some of the objects thereof.

Figure 6:
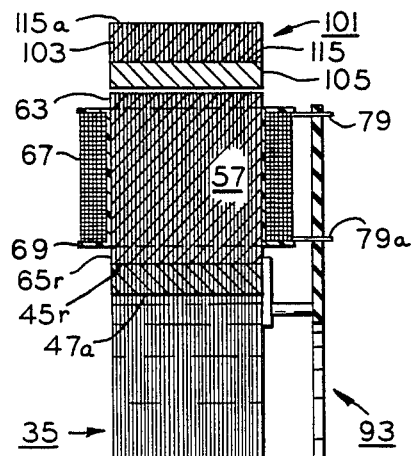
FIG. 6 is a sectional view taken along line 6—6 in FIG. 1.
Figure 7:
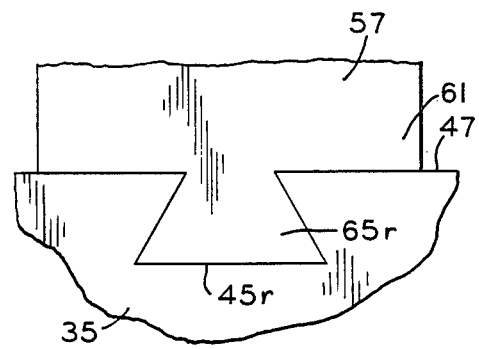
FIG. 7 is an enlarged partial view taken from FIG. 1 illustrating the displacement preventing engagement of an extension on one of the salient pole pieces received within one of the notch rows in an outer circumferential surface of the yoke section.

At this time in the fabrication of ECM 31, intermediate and base sections 59, 61 of salient pole pieces 57 may be inserted or passed at least in part through openings 73 in wound bobbins 69 so as to dispose opposite flanges 75, 75a thereof at least adjacent base and tip sections 61, 63 of the salient pole pieces with at least projection rows 65r thereof protruding or extending from the wound bobbins beyond opposite flange 75a thereof, respectively, as best seen in FIGS. 5-7. Upon the above discussed assembly of salient pole pieces 57 with wound bobbin 69, projection rows 65r on the salient pole pieces are moved, such as by sliding or press fitting or the like, into interlocking or displacement preventing engagement with notch rows 45r in outer circumferential surface 47 of yoke section 35, respectively. When projection rows 65r on salient pole pieces 57 are so received within notch rows 45r of yoke section 35, base sections 61 of the salient pole pieces are engaged with outer circumferential surface 47 of the yoke section at least generally adjacent notch rows 45r therein, and wound bobbins 69 are captured or caged generally between tip sections 63 on the salient pole pieces and the outer circumferential surface on the yoke section at least adjacent the notch rows therein, respectively. Further, upon the reception of projection rows 65r on salient pole pieces 57 in displacement preventing engagement within notch rows 45r of yoke section 35, the salient pole pieces extend about preselected pitch axes 39 therefor generally outwardly from outer circumferential surface 47 on the yoke section, and opposite end faces 55, 55a of the salient pole pieces are disposed so as to be at least generally coextensive with opposite end faces 49, 49a on the yoke section, respectively. Due to the particular cooperating keystone or dovetail configurations of projection rows 65r on salient pole pieces 57 and notch rows 45r in yoke section 35, the aforementioned displacement preventing engagement therebetween obviates displacement of the salient pole pieces from the yoke section in a direction generally outwardly of outer circumferential surface 47 thereof, and it is believed that the interfacing engagement between the projection rows and the notch rows may obviate displacement of the salient pole pieces from the yoke section generally axially thereof, i.e., past either opposite end face 49, 49a thereof, respectively. Thus, with salient poles 37 being formed so as to extend generally radially outwardly from outer circumferential surface 47 of yoke section 35, it may be noted that ECM 31 is of the inside-out type as compared to a salient pole dynamoelectric machine having salient poles extending generally radially inwardly from the yoke section thereof.

In addition to the foregoing, it may be noted that the association of salient pole pieces 57 with wound bobbins 69 thereon in mounting relation with yoke section 35 at least adjacent outer circumferential surface 47 thereof is effective to form, establish or otherwise define salient poles 37 of ECM 31. Furthermore, since yoke section 35 has been characterized as being generally loose wound from deformed lanced strip 33, as previously mentioned, it may also be noted that the reception of projection rows 65r on salient pole pieces 57 in the displacement preventing engagement thereof with notch rows 45r in the yoke section is believed to be effective to retain the generally loose wound helical convolutions of the deformed lanced strip which define the yoke section against displacement from the previously mentioned aligned configuration thereof.

Figure 8:
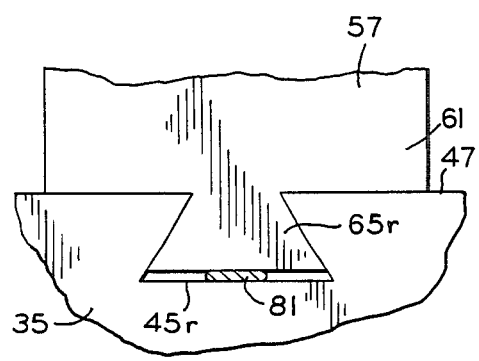
FIG. 8 is generally the same as FIG. 7 but showing an alternative construction of a wedge pin disposed in interlocking or displacement preventing engagement between the salient pole piece extension and the notch row of the yoke section thereby to illustrate an alternative inside-out salient pole electronically commutated motor in one form of the invention and an alternative method of fabricating a core in one, respectively.

In an alternative fabricating method, as best seen in FIG. 8, a set of wedging means or wedges 81 may be wedged or otherwise inserted into wedging engagement between projection rows 65r on salient pole pieces 57 and notch rows 45r in yoke section 35 thereby to insure or enhance the aforementioned displacement preventing engagement between the projections and notch rows, respectively. Thus, if the tolerance variations of notch rows 45r and projection rows 65r are such that a slide fit or press fit therebetween is unattainable during the assembly of salient pole pieces 57 with yoke section 35, wedges 81 interposed between the notch rows and projection rows are effective to wedge them into the desired displacement preventing engagement, respectively.

Figure 9:
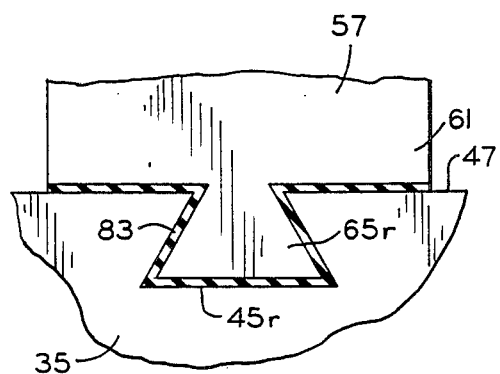
FIG. 9 is also generally the same as FIG. 7 but showing a hardenable adhesive material disposed in adhering engagement between the salient pole piece extension and the notch row of the yoke section thereby to illustrate another alternative inside-out salient pole electronically commutated motor in one form of the invention and another alternative method of fabricating a core, respectively.

In another alternative fabricating method as best seen in FIG. 9, a hardenable adhesive material 83 may be applied between projection rows 65r on salient pole pieces 57 and notch rows 45r in yoke section 35, and the hardenable adhesive material may then be hardened in place to at least assist in insuring or enhancing the aforementioned displacement preventing engagement of the projections and notch rows, respectively. Of course, some hardenable adhesive material 83 may also be hardened in place between base sections 61 of salient pole pieces 57 and outer circumferential surface 47 of yoke section 35 adjacent notch rows 45r therein, respectively.

Upon the securement of salient pole pieces 57 with wound bobbins 69 thereon to yoke section 35, a set or plurality of winding receiving slots 85 are provided between adjacent ones of the salient pole pieces, and concentrated windings 67 disposed about the salient pole pieces extend or protrude through adjacent ones of the slots, respectively, as best seen in FIG. 10. Each of slots 85 have a closed end portion 87 defined by outer circumferential surface 47 on yoke section 35 between base sections 61 of adjacent ones of salient pole pieces 57, and an open end portion 89 of each slot is defined generally between opposed tip ends 63a, 63b of tip sections 63 on adjacent ones of the salient pole pieces, respectively.

When salient pole pieces 57 are so secured to yoke section 35, as discussed above, connecting means, such as a generally annular printed circuit board 91 or the like for instance may be mounted by suitable means to the yoke section at least generally adjacent one of opposite end faces 49, 49a thereof, and opposite ends 79, 79a of conductors 77 defining concentrated windings 67 on bobbins 69 may be connected in circuit relation with the printed circuit board, as best seen in FIG. 6. Therefore, a multistage winding arrangement, indicated generally at 93, includes concentrated windings 67 associated with salient pole pieces 57 and interconnected in circuit relation with printed circuit board 91, and the concentrated windings are, of course, adapted to be electronically commutated in at least one preselected sequence to effect the energization of ECM 31, as discussed in greater detail hereinafter.

While yoke section 35 has been discussed herein for purposes of disclosure as comprising generally loose wound helical convolutions of deformed lanced strip 33 associated in aligned relation in the yoke section, it is contemplated that such helical convolutions of the deformed lanced strip may be secured together by suitable means well known to the art, such as welding or bonding or the like for instance, thereby to provide a generally rigid yoke section prior to the association therewith of salient pole pieces 57 within the scope of the invention so as to meet at least some of the objects thereof. Furthermore, while projection rows 65r on salient pole pieces 57 and notch rows 45r in yoke section 35 are illustrated herein as having a cooperating dovetail or keystone shaped configuration for purposes of disclosure, it is contemplated that various other projection rows and notch rows having various other configurations may be utilized within the scope of the invention so as to meet at least some of the objects thereof. Additionally, even though bobbins 69 have been shown and discussed herein as a means to electrically insulate concentrated windings 67 from salient pole pieces 57 and yoke section 35 for purposes of disclosure, it is contemplated that various other schemes or components may be utilized to effect such electrical insulation within the scope of the invention so as to meet at least some of the objects thereof. For instance, in an alternative fabricating method as best seen in FIG. 11, an integral insulation, indicated generally at 95 is adhered to yoke section 35 and salient pole pieces 57 with tip sections 63 on the salient pole pieces being, of course, masked from such integral insulation. If a more detailed explanation of integral insulation 95 and/or its application to components is desired, reference may be had to U.S. Pat. No. 3,122,667 issued Feb. 25, 1964 which is incorporated by reference herein.

Figure 12:
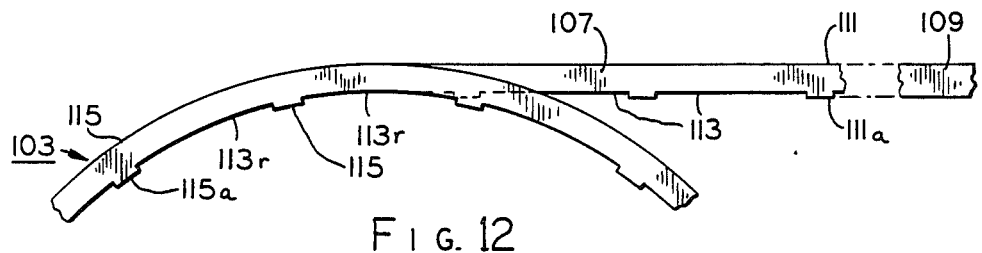
FIG. 12 is an enlarged partial view taken from FIG. 1 showing a rotor of the inside-out salient pole electronically commutated motor as edgewise wound from another lanced strip of generally thin ferromagnetic material.
Figure 13:
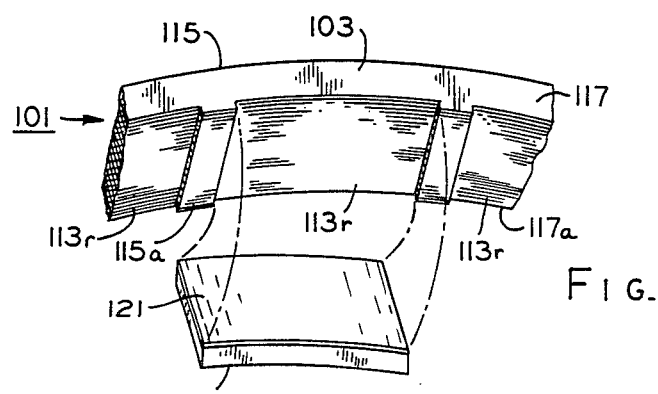
FIG. 13 is an enlarged partial perspective view of the edgewise wound rotor of FIG. 12 showing one permanent magnet material element of a set thereof associated with the edgewise wound rotor.

Either prior or subsequent to the fabrication of yoke section 35 and the component parts associated therewith, as discussed above, or generally simultaneous therewith, a permanent magnet rotor or rotor means 101 for ECM 31 may also be fabricated or assembled which includes a rotor 103 and a set or plurality of permanent magnet material elements 105, as best seen in FIGS. 12 and 13. Rotor 103 may be edgewise wound or formed from another lanced strip 107 lanced or otherwise formed by suitable means well known to the art, such as a progressive die set (not shown) or the like for instance, from a strip stock 109 of generally thin ferromagnetic material having desired electrical and magnetic characteristics as well as physical properties to enhance edgewise winding of the lanced strip. A pair of opposite edges 111, 111a are provided on lanced strip 107 extending generally lengthwise thereof, and a set or plurality of predeterminately spaced apart location notches 113 are provided in opposite edge 111a of the lanced strip along the length thereof.

Lanced strip 107 may be edgewise and helically deformed or wound and accumulated in a generally annular stack of helical convolutions thereof defining rotor 103 generally in the same manner discussed hereinabove with respect to the edgewise deformation of lanced strip 33 into yoke section 35. Therefore, opposite edges 111, 111a of edgewise deformed lanced strip 107 define generally radially spaced apart outer and inner circumferential surfaces 115, 115a on rotor 103, and the inner and outer circumferential surfaces extend generally transversely or axially across the rotor between a pair of generally axially spaced apart opposite end faces 117, 117a thereof respectively. Of course, the leading and trailing end portions on edgewise deformed lanced strip 107 forming edgewise wound rotor 103 define opposite end faces 117, 117a thereof, respectively. Further, location notches 113 in opposite edge 111a of lanced strip 107 in rotor 103 are arranged or aligned in a set or plurality of rows 113r thereof in inner circumferential surface 115 of the rotor, and the location notch rows are arcuately spaced apart about the inner circumferential surface extending generally transversely or axially thereacross between opposite end faces 117, 117a of the rotor, respectively. As previously discussed with respect to yoke section 35, the generally loose wound helical convolutions of deformed lanced strip 107 in rotor 103 are easily adjustable or positioned one to another thereof, and such adjusting or positioning may be accomplished by associating the rotor with an alignment fixture or arbor, as is well known in the art, to effect the desired aligned configuration of location notch rows 113r and outer and inner circumferential surfaces 115, 115a of the rotor; however, for the sake of brevity of disclosure and drawing simplification, the aforementioned association of the rotor with such alignment arbor is omitted. Upon the fabrication of edgewise wound rotor 103, as discussed above, another hardenable adhesive material 121 may be applied to permanent magnet material elements 105 and/or notch rows 113r in inner circumferential surface 115 of the rotor, and the permanent magnet material elements may then be located or otherwise arranged in preselected assembly or located positions therefor within the locating notch rows in locating engagement therewith, respectively. Upon the hardening of hardenable adhesive material 121 thereby to secure permanent magnet material elements 105 in the preselected located positions thereof on rotor 103 against displacement therefrom, the rotor may be disposed or arranged in an operative or rotating position generally circumferentially about yoke section 35 with permanent magnet material elements 105 spaced generally radially outwardly from tip sections 63 of salient pole pieces 57 secured to the yoke section thereby to define a magnetic gap generally between the tip sections and the permanent magnet material elements. While permanent magnet material elements 105 are of the neodymium type available from General Motors Corporation, Detroit, Mich. under the tradename "Magnequench I", it is contemplated that other types of permanent magnet material elements may be employed within the scope of the invention so as to meet at least some of the objects thereof. To complete the discussion of the fabricating method for inside-out salient pole electronically commutated motor 31, when permanent magnet rotor 101 is associated in its operative position about yoke section 35, permanent magnet material elements 105 are disposed for selective magnetic coupling relation with concentrated windings 67 on salient pole pieces 57 upon the electronic commutation of the concentrated windings, as discussed in greater detail hereinafter. While ECM 31 is disclosed as having twenty-four salient poles 37 with permanent magnet rotor means 101 having sixteen permanent magnet material elements 105, it is contemplated that a different number of salient poles and permanent magnet material elements may be utilized within the scope of the invention so as to meet at least some of the objects thereof.

Figure 14:
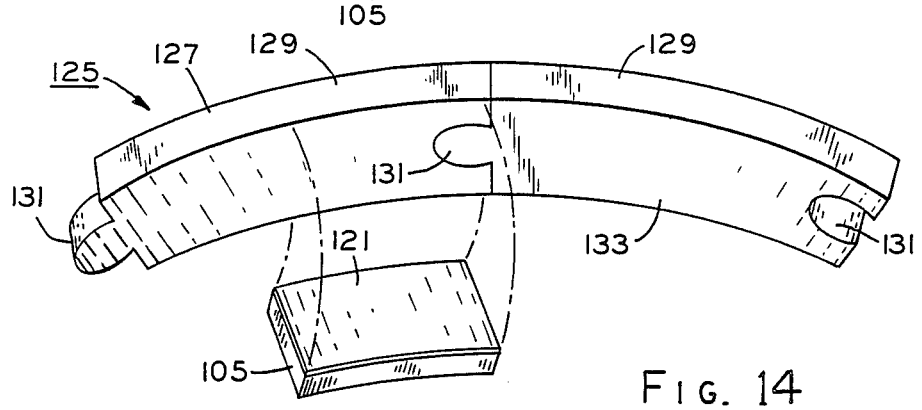
FIG. 14 is a partial perspective view of an alternative rotor construction which may be utilized in the inside-out salient pole electronically commutated motor of FIG. 1 in one form of the invention.

An alternative permanent magnet rotor means 125 is illustrated in FIG. 14 for use in ECM 31 within the scope of the invention so as to meet at least some of the objects thereof. Permanent magnet rotor means 125 includes a generally annular rotor 127 having a plurality or set of generally arcuate segments 129 formed from a ferromagnetic material, and each arcuate segment includes means, indicated at 131, for interlocking in displacement preventing engagement with an adjacent one of the segments defining the rotor, as well known to the art. Interlocked arcuate segments 129 define an inner circumferential surface 133 on rotor 127, and permanent magnet material elements 105 may be adhered to the inner circumferential surface in preselected arcuately spaced apart located positions thereabout.

Figure 15:
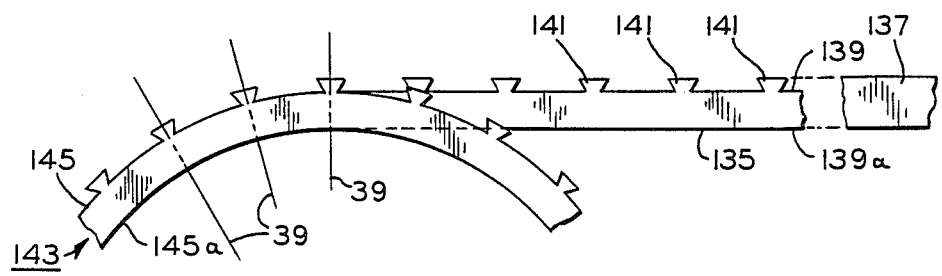
FIG. 15 is a partial front elevational view of an alternative yoke section of an alternative salient pole core in one form of the invention as edgewise wound from a lanced strip of generally thin ferromagnetic material and teaching principles which may be employed in an alternative method of fabricating a salient pole electronically commutated motor.

Another alternative method of fabricating salient pole electronically commutated motor 31 is shown in FIGS. 15-17 utilizing generally the same component parts as previously discussed with the exception noted hereinafter.

Another lanced strip 135 may be lanced from a strip stock 137 of generally thin ferromagnetic material by suitable means, such as a progressive die set (not shown) or the like for instance as well known to the art, and the lanced strip is provided with a pair of opposite edges 139, 139a extending generally lengthwise thereof as best seen in FIG. 15. A plurality of generally keystone or dovetail shaped projections 141 are integrally formed on opposite edge 139 of lanced strip 135 in predetermined spaced apart relation along the length thereof.

Lanced strip 135 may be edgewise and helically deformed or wound and accumulated in a generally annular stack of helical convolutions thereof defining a yoke section 143 in the same manner as previously discussed with respect to the edgewise deformation of lanced strip 33 into yoke section 35 as best seen in FIGS. 15 and 16. Therefore, opposite edges 139, 139a of edgewise deformed lanced strip 135 define generally radially spaced apart outer and inner circumferential surfaces 145, 145a on yoke section 143, and the outer and inner circumferential surfaces extend generally axially across the yoke section between a pair of opposite end faces 149, 149a thereof. Of course, the leading and trailing portions on edgewise deformed lanced strip 135 forming yoke section 143 define opposite end faces 149, 149a thereof, respectively. Further, projections 141 on opposite edge 139 of lanced strip 135 in yoke section 143 are arranged or aligned in a set or plurality of rows or row formations 141r thereof, and projection rows 141r extend generally outwardly on pitch axes 39 from outer circumferential surface 145 and generally axially thereacross between opposite end faces 149, 149a of yoke section 143, respectively.

Alternative salient pole pieces 153 are fabricated from a plurality of lanced pole piece laminations 155 generally in the same manner as the previously discussed fabrication of salient pole pieces 63 from lanced pole piece laminations 57. It may be noted that a base section 157 on pole piece laminations 155 extends in part generally laterally beyond intermediate section 59 thereof in spaced apart relation with tip section 63, and the base section has a generally keystone or dovetail shaped opening or notch 159 therethrough. Of course, when pole piece laminations 155 are stacked in interconnected relation to form salient pole pieces 153, base sections 157 on such pole piece laminations extend across the salient pole pieces between opposite end faces 149, 149a thereof, and notches 159 through the base sections are aligned generally in a row or row formation 159r thereof between the opposite end faces of the salient pole piece, respectively.

Insulating means, such as a split bobbin 163 of suitable insulation material, has generally the same component parts as the previously discussed bobbin 69 with the exception that the split bobbin is severed along a parting line 165 extending through sleeve 71 and opposite flanges 75, 75a of the split bobbin. Therefore, split bobbin 163 may be opened or spread apart at parting line 165 thereof, and when so spread apart, the split bobbin may be disposed in an assembly position thereof on salient pole piece 153. When split bobbin 163 is in its assembly position on salient pole piece 153, intermediate section 59 thereof is received within opening 73 through sleeve 71 of the split bobbin, and opposite flanges 75, 75a of the split bobbin are disposed at least adjacent tip section 63 and base section 157 on the salient pole piece. Thus, in its assembly position, split bobbin 163 is captured or caged on salient pole piece 153 against displacement therefrom between tip section 63 and base section 157 of the salient pole piece. Thereafter, a preselected number of conductor turns of insulated conductor 77, may be randomly or layer wound about sleeve 71 of split bobbin 163 between opposite flanges 75, 75a thereof so as to form a concentrated winding 67 while the split bobbin is disposed in its assembly position on salient pole piece 153. After concentrated winding 67 is wound about split bobbin 163 on salient pole piece 153, notch row 159r in base section 157 of respective ones of the salient pole pieces are moved, such as by sliding or press fitting or the like for instance, into interlocking or displacement preventing engagement with projection rows 141r extending from outer circumferential surface 145 of yoke section 143, respectively. When notch rows 159r in salient pole pieces 153 are so arranged in the displacement preventing engagement thereof with projection rows 141r on yoke section 143, parts of base section 157 adjacent the notch rows in the salient pole pieces are engaged in abutment with parts of outer circumferential surface 145 on the yoke section adjacent the projection rows, and opposite end faces 55, 55a of the salient pole pieces are generally coextensive with opposite end faces 149, 149a on the yoke section, respectively. Thus, when so secured to yoke section 143, salient pole pieces 153 with concentrated windings 67 thereon extend on preselected pitch axes 39 generally outwardly from outer circumferential surface 145 of the yoke section, and rotor 103 may be associated in assembly relation generally circumferentially about tip sections 63 of the salient pole pieces on the yoke section with permanent magnet material elements 105 on the rotor defining with the tip sections on the salient pole pieces the magnetic gap therebetween, respectively.

Still another alternative method of fabricating ECM 31 is shown in FIGS. 18-21 utilizing generally the same component parts as previously discussed with the exceptions noted hereinafter.

In practicing this alternative fabrication method, another lanced strip 171 may be lanced from strip stock 173 of generally thin ferromagnetic material by suitable means, such as a progressive die set (not shown) or the like, and the lanced strip is provided with a pair of opposite edges 175, 175a extending generally lenthwise thereof as best seen in FIG. 18. A plurality of projections 177 are integrally formed on opposite edge 175 of lanced strip 171 in predetermined spaced apart relation along the length thereof, and a plurality of location notches 179 are formed between the projections, respectively.

Lanced strip 171 may be edgewise and helically deformed or wound and accumulated in a generally annular stack thereof defining a yoke section 181 for salient pole electronically commutated motor 31 in the same manner as previously discussed with respect to the edgewise deformation of lance strip 33 into yoke section 35 as best seen in FIGS. 18 and 21. Therefore, opposite edges 175, 175a of edgewise deformed lance strip 171 define generally radially spaced apart outer and inner circumferential surfaces 183, 183a on yoke section 181, and the outer and inner circumferential surfaces extend generally axially across the yoke section between a pair of opposite end faces 185, 185a thereon, respectively. The leading and trailing end portions of edgewise deformed lanced strip 171 forming yoke section 181 define opposite end faces 185, 185a thereon, respectively. Further, projections 177 and location notches 179 in opposite edge 175 of lanced strip 171 in yoke section 181 are arranged or aligned in sets or pluralities of rows or row formations 177r, 179r thereof, and the location notch rows extend generally axially across outer circumferential surface 183 on yoke section 181 between opposite end faces 185, 185a thereof, respectively.

An alternative salient pole piece 187 for association with yoke section 181 has generally the same component parts as the previously discussed salient pole piece 153 with the exception that notch row 159r of salient pole piece 153 is omitted from salient pole pieces 187. Further, split bobbin 163 and concentrated winding 67 are assembled with salient pole piece 187 generally in the same manner as previously discussed with respect to the assembly of the split bobbin and concentrated winding with salient pole piece 153. When split bobbins 163 and concentrated windings 67 are so assembled about salient pole pieces 187, a hardenable adhesive material 189 may be applied onto base sections 157 of the salient pole pieces and/or onto notch rows 179r of yoke section 181, and the base sections of the salient pole pieces may be seated or located in preselected located or assembly positions within the notch rows of the yoke section. Upon the hardening of hardenable adhesive material 189 between base sections 157 of salient pole pieces 187 and notch rows 179r in yoke section 181, the salient pole pieces are secured in displacement preventing engagement with the yoke section, and the salient pole pieces extend on preselected pitch axes 39 generally outwardly from outer circumferential surface 183 of the yoke section, respectively. Thereafter, rotor 103 may be associated in assembly relation generally circumferentially about tip sections 63 of salient pole pieces 187 on yoke section 181 with permanent magnet material elements 105 on the rotor defining with the tip sections on the salient pole pieces the magnetic gap therebetween, respectively.

With reference again to the drawings in general and recapitulating at least in part with respect to the foregoing, there is illustrated in one form of the invention a salient pole core 191 for a dynamoelectric machine, such as for instance ECM 31 or the like (FIG. 1). Salient pole core 191 has edgewise wound yoke 35 which includes edgewise and helically wound strip 33 of generally thin ferromagnetic material with at least one edge 43 thereon defining outer circumferential surface 47 on the yoke and extending generally axially thereacross (FIGS. 2, 5 and 6). A set of salient pole pieces 57 are secured to edgewise wound yoke 35 at least generally adjacent its outer circumferential surface 47 and extend therefrom generally outwardly about preselected pitch axes 39, respectively (FIGS. 1 and 5-7).

Figure 22:
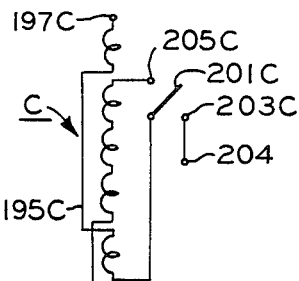
FIG. 22 is a schematic diagram showing a multistage winding arrangement for the inside-out salient pole electronically commutated motor of FIG. 1.
Figure 23:
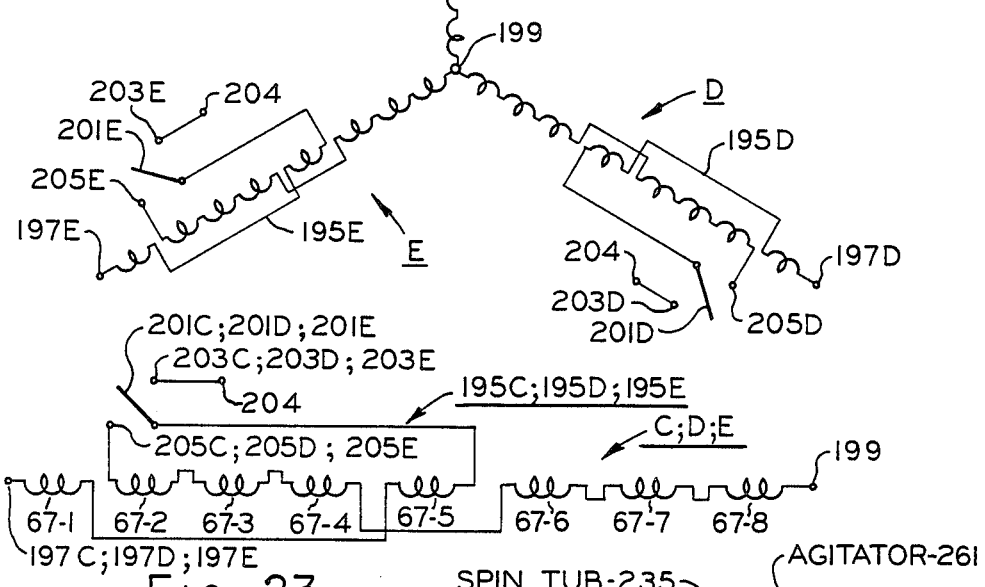
FIG. 23 is an enlarged partial view taken from FIG. 22 showing illustrating the like winding configuration of the winding stages of the multistage winding arrangement.

Further, salient pole electronically commutated motor 31 in one form of the invention has edgewise wound yoke 35 which includes edgewise and helically wound strip 33 having at least one edge 43 thereon defining outer circumferential surface on the yoke extending generally axially thereacross (FIGS. 1, 2, 5 and 6). Salient pole pieces 57 are secured to yoke 35 at least generally adjacent its outer circumferential surface 47 and extend outwardly therefrom about preselected pitch axes 39, respectively (FIGS. 5 and 6). Multistage winding arrangement 93 has a plurality or set of winding stages C, D, E each including a set of concentrated windings 67-1 to 67-8 disposed about salient pole pieces 57 and with the concentrated winding stages being adapted to be electronically commutated in at least one preselected sequence (FIGS. 1, 22 and 23). Permanent magnet rotor means 101 is arranged generally circumferentially about salient pole pieces 57 and is associated in selective magnetic coupling relation with concentrated winding stages C, D, E for driven rotation in response to the electronic commutation of at least some of concentrated windings 67-1 to 67-8 of the concentrated winding stages in the at least one preselected sequence, respectively (FIGS. 1, 22 and 23).

Figure 29:
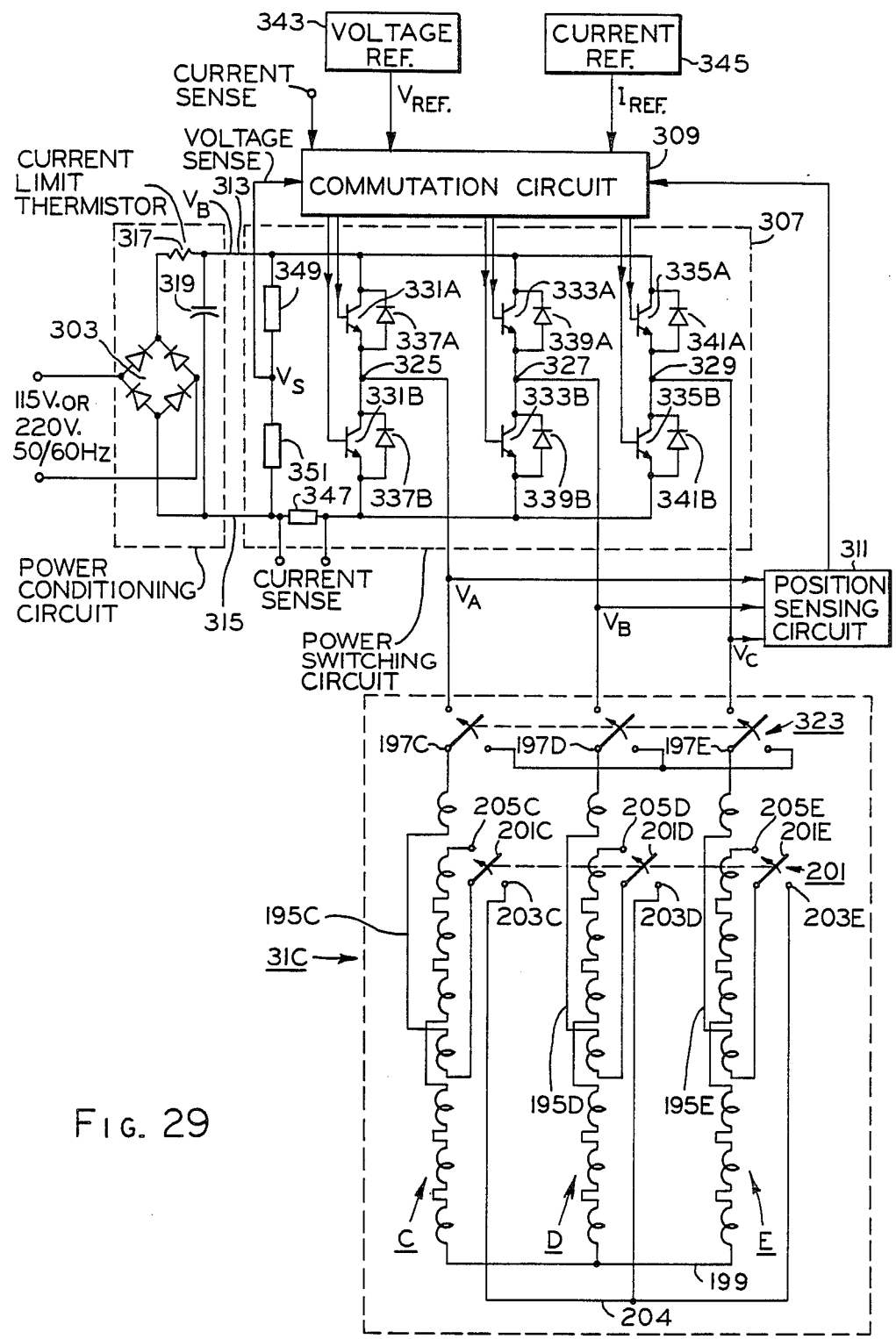
FIG. 29 is a schematic diagram of an exemplary control circuit for the inside-out salient pole electronically commutated motor of FIG. 1 as drivingly associated with the apparatus of FIG. 24.

More particularly and with specific reference to FIGS. 22 and 23, concentrated winding stages C, D, E in multistage winding arrangement 93 of ECM 31 are each of like winding configuration including eight concentrated windings indicated as 67-1 to 67-8, as best seen in FIG. 23; however, in FIG. 1, the concentrated windings are designated by reference numerals 67-1C to 67-8C, 67-1D to 67-8D and 67-1E to 67-8E for the purposes of identifying each concentrated winding in the particular winding stage in which it is connected. Each concentrated winding stage C, D, E has a tapped section 195C, 195D, 195E including concentrated windings 61-1 and 61-5 of the particular concentrated winding stage, and the tapped sections are interposed between one end terminal 197C, 197D, 197E of each concentrated winding stage and the other end terminals thereof which are commonly connected at 199, respectively. Tapped sections 195C, 195D, 195E of the concentrated winding stages are controlled by a set or plurality of switch means operable generally between a pair of switching modes, such as for instance ganged, single pole, double throw relay means or tap relays 201C, 201D, 201E for making with and breaking from a pair of relay or tap terminals 203C, 203D, 203E and 205C, 205D, 205E, respectively. While switch means 201C, 201D, 201E are illustrated herein for purposes of disclosure as being relays, it is contemplated that other switch means either of the solid state type or the electromechanical type may be utilized within the scope of the invention so as to meet at least some of the objects thereof. It may be noted that tap terminals 203C, 203D, 203E are connected in common at 204, as best seen in FIG. 29. Thus, when relays 201C, 201D, 201E are made with tap terminals 203C, 203D, 203E, only tapped sections 195C, 195D, 195E of concentrated winding stages C, D, E are connected in circuit relation end terminals 197C, 197D, 197E and common end terminal 199, and when the relays are made with tap terminals 205C, 205D, 205E, then all of concentrated windings 67-1 to 67-8 in the concentrated winding stages are connected in circuit relation between end terminals 197C, 197D, 197E and common end terminal 199 thereof, respectively. It may be noted that when tapped sections 195C, 195D, 195E are connected across end terminals 197C, 197D, 197E and common end terminal 199, the tapped sections may be electronically commutated in one preselected sequence to effect the operation of ECM 31 in a low speed-high torque mode wherein permanent magnet rotor means 101, in the selected magnetic coupling relation thereof with concentrated winding stages C, D, E, is driven with oscillatory movement, i.e., in clockwise and counterclockwise directions, and when all of concentrated windings 67-1 to 67-8 in the concentrated winding stages are connected across end terminals 197C, 197D, 197E and common end terminal 199, the concentrated winding stages may be electronically commutated in another preselected sequence to effect the operation of ECM in a high speed-low torque mode wherein the permanent magnet rotor means is driven with rotational movement in one of the aforementioned clockwise and counterclockwise directions, as discussed in greater detail hereinafter. While concentrated winding stages C, D, E of ECM 31 have been illustrated herein as having tapped sections 195C, 195D, 195E for the purposes of disclosure, it is contemplated that other such concentrated winding stages having tapped sections in excess of one with at least one concentrated winding therein or other such concentrated winding stages without a tapped section therein may be utilized within the scope of the invention so as to meet at least some of the objects thereof. Additionally, while ECM 31 has been illustrated herein as being electronically commutated in one preselected sequence to effect the operation of the ECM in its low speed-high torque mode and in another preselected sequence to effect the operation of the ECM in its high speed-low torque mode, merely for the purpose of disclosure, it is contemplated that such ECM may be provided with concentrated winding stages without taps therein which may be electronically commutated in a preselected sequence to afford a desired operation of the ECM within the scope of the invention so as to meet at least some of the objects thereof. If a more detailed discussion of an electronically commutated motor operable in a low speed-high torque mode and a high speed-low torque mode is desired, reference may be had to U.S. Pat. No. 4,528,485 issued Jul. 9, 1985, the disclosure of which is incorporated herein by reference.

Figure 24:
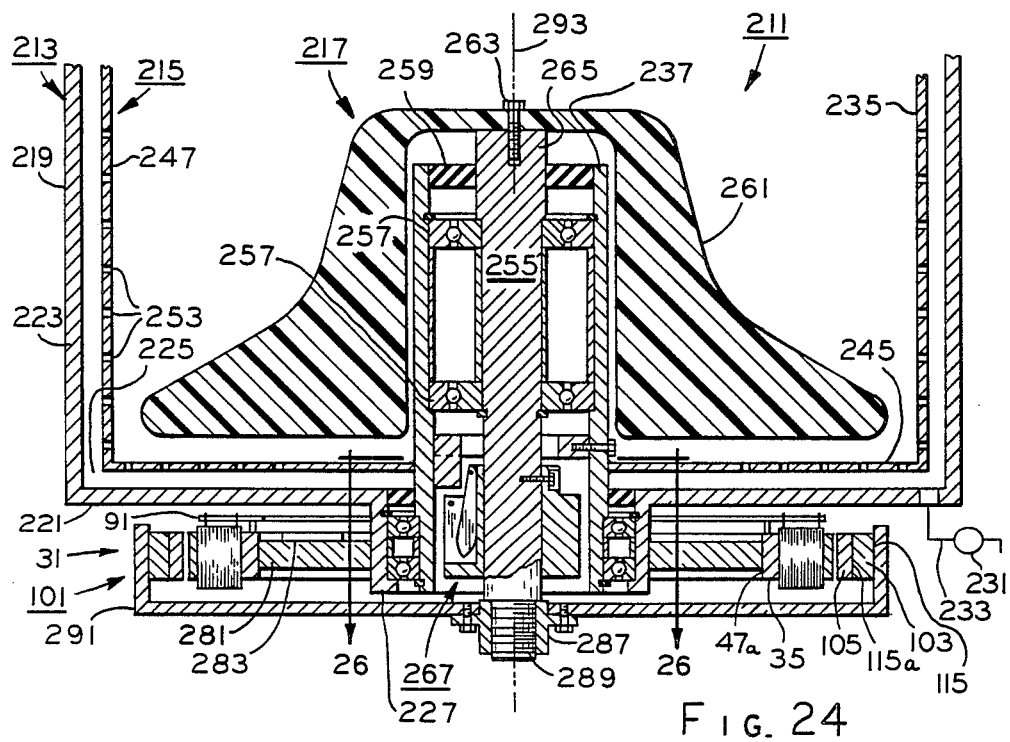
FIG. 24 is a schematic view partially in section of apparatus for laundering fabrics in a fluid.

With further reference to the drawings in general and recapitulating at least in part with respect to the foregoing, an apparatus or laundering machine 211 is shown schematically for laundering fabrics (not shown) in a fluid (not shown), and the apparatus is provided with means 213 for receiving fluid therein (FIG. 24). Spinning means 215 is disposed in receiving means 213 and is operable in a spin mode for spinning the fabrics to effect centrifugal displacement of fluid therefrom, and means, indicated generally at 217, is conjointly operable with spinning means 215 in the spin mode and is operable independently of the spinning means in a laundering mode for agitating the fabrics in fluid in receiving means 213 (FIG. 24). Inside-out salient pole electronically commutated motor 31 has its yoke 35 secured in mounting relation to receiving means 213 exteriorly thereof, and concentrated winding stages C, D, E adapted to be electronically commutated in a plurality of preselected sequences define salient poles 37 generally outwardly of the yoke on pitch axes 39, respectively (FIGS. 1 and 24). Permanent magnet rotor means 101 arranged generally circumferentially about salient poles 37 on yoke 35 is associated in selective magnetic coupling relation with concentrated winding stages C, D, E for rotatably driving agitating means 217 to effect its independent operation in the laundering mode upon the electronic commutation of the concentrated winding stages in one of the preselected sequences and for rotatably driving the agitating means upon the conjoint operation thereof with spinning means 215 in the spin mode when the concentrated winding stages are electronically commutated in another of the preselected sequences (FIGS. 1 and 24).

Figure 25:
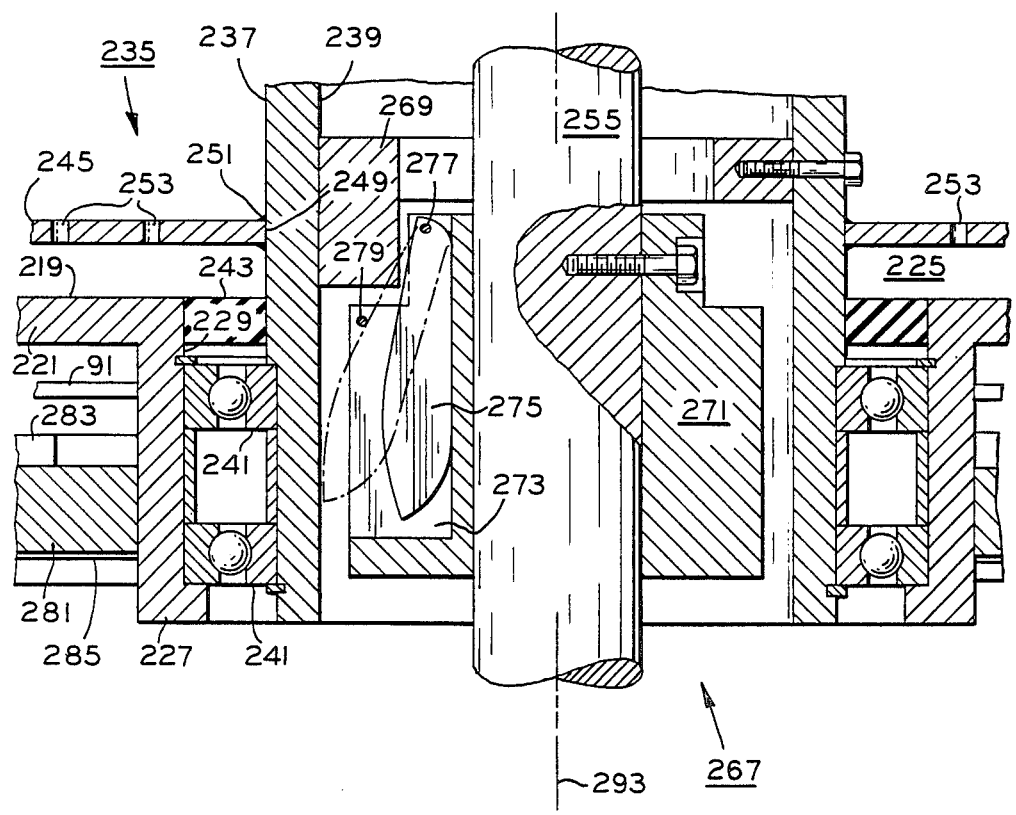
FIG. 25 is an enlarged partial view taken from FIG. 24.

More particularly and with specific reference to FIGS. 24 and 25, receiving means 217 comprises a fluid tub 219 having a generally annular base wall 221, and a generally circumferential sidewall 223 may be integrally formed with the base wall defining therewith a chamber or chamber means 225 for the laundering fluid within the fluid tub. A generally annular flange or flange means 227 integral with base wall 221 of fluid tub 219 depends therefrom and defines an opening or passage 229 which extends through the base wall to intersect or communicate with fluid chamber 225 in the fluid tub. A pump or pumping means 231 is associated or connected in fluid communication with chamber 225 in fluid tub 219 by suitable means, such as a conduit 233 or the like for instance, and the pump is operable for pumping or draining at least a part of the fluid from the fluid tub at least during the spin mode operation of spinning means 215, as discussed in greater detail hereinafter. Albeit now shown for purposes of brevity of disclosure and drawing simplification, fluid tub 219 may be either fixedly secured against movement to a cabinet (not shown) for apparatus 211 in any suitable manner well known to the art or may be movably supported within such cabinet in any suitable manner well known to the art.

Spinning means 215 comprises a spin tub or basket 235 and a tubular sleeve 237 arranged for conjoint rotation and with the tubular sleeve having a stepped opening 239 therethrough. Tubular sleeve 237 extends at least in part generally coaxially through flange 227 on fluid tub 219 and into chamber 225 thereof, and bearing means, such as a set of ball bearings 241 or the like for instance, are disposed or retained by suitable means well known to the art within flange opening 229 in journaling or bearing engagement between flange 227 and the tubular sleeve thereby to rotatably support spinning means 215 in apparatus 211. Means, such as a running seal 243 or the like for instance well known to the art, is also provided for sealing between flange 227 and tubular sleeve 237, and the sealing means or running seal retains the fluid within chamber 225 of fluid tub 219 against passage therefrom through opening 229 in the flange of the fluid tub while also isolating bearings 241 from the fluid. Spin tub 235 is rotatably disposed within fluid tub 219 and is arranged to receive the fluid and fabric to be laundered therein, and the spin tub is provided with an integral base wall 245 and circumferential sidewall 247 arranged generally adjacent base wall 221 and sidewall 223 of fluid tub 219 in spaced apart relation therewith, respectively. An opening 249 in base wall 245 of spin tub 235 is disposed about tubular sleeve 237 in chamber 225, and means, such welds 251 or the like for instance, are provided generally about opening 249 for securing the spin tub and tubular sleeve together so as to be conjointly rotatable. A plurality of apertures or passage means 253 are provided through base wall 245 and sidewall 247 of spin tub 235 for the passage of fluid therethrough when fluid is received in fluid tub 219 or drained therefrom at least upon the spin mode operation of spinning means 215, as discussed in greater detail hereinafter.

A rotatable spindle or shaft 255 extends generally coaxially through opening 239 in tubular sleeve 237, and bearing means, such as a set of ball bearings 257 or the like for instance, are disposed or retained by suitable means well known to the art within the tubular sleeve opening in journaling or bearing engagement between the tubular sleeve and the shaft thereby to rotatably support the shaft. Means, such as another running seal 259 or the like for instance as well known in the art, is provided for sealing between tubular sleeve 237 and shaft 255, and the sealing means or running seal obviates the passage of fluid from chamber 225 in fluid tub 219 through opening 239 in the tubular sleeve while also isolating bearings 257 from the fluid. An agitator 261 is rotatably disposed in spin tub 215 and is secured by suitable means, such as a bolt 263 or the like for instance, to an upper end or end portion 265 of shaft 255 which extends through running seal 259. Thus, shaft 255 and agitator 261 are interconnected for conjoint rotation and generally comprise agitating means 217.

Figure 26:
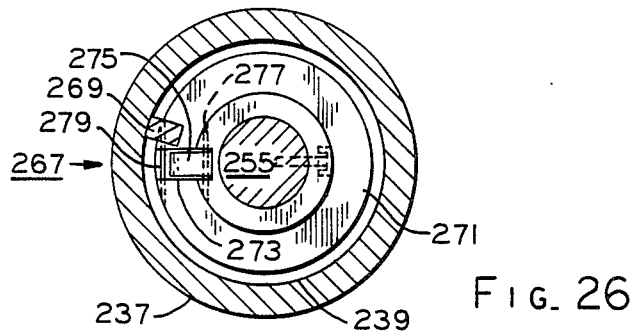
FIG. 26 is an enlarged sectional view taken along line 26—26 in FIG. 24.

As best seen in FIGS. 25 and 26, a clutch means or clutch device 267 associated with spinning means 215 and agitating means 217 is operable generally in response to rotational speeds in excess of a preselected value of the agitating means for effecting the conjoint operation of the agitating means and the spinning means in the spin mode operation thereof, as discussed in greater detail hereinafter. Clutch 267 has an abutment or abutment means 269 disposed within opening 239 of tubular sleeve 237 and secured by suitable means to the tubular sleeve for conjoint rotation therewith. Clutch 267 also includes a sleeve housing 271 disposed about shaft 255 within tubular sleeve opening 239 and secured by suitable means to the shaft for conjoint rotation therewith. Sleeve housing 271 has a generally vertical slot 273 therein, and a rotational speed responsive member, such as a pivoted arm or abutment 275 or the like for instance, is pivotally movable in the slot being pivotally mounted on a pivot pin 277 carried by the sleeve housing in spanning relation across the slot. A stop or abutment pin 279 is also carried by sleeve housing 271 in spanning relation across slot 273 for abutting or displacement limiting engagement with pivot arm 275 to define its pivotally displaced position in response to rotational speeds of the shaft in excess of the aforementioned preselected value, as illustrated in dotted outline in FIG. 25. Of course, when pivot arm 275 is engaged with stop 279, the pivot arm is also engaged or abutted in driving relation with abutment 269 on tubular sleeve 237 to effect the conjoint rotation of spinning means 215 and agitating means 217, as discussed in detail hereinafter.

Yoke section 35 of ECM 31 is secured in mounting relation generally circumferentially about flange 227 of fluid tub 219 by suitable means, such as a generally annular mounting device 281 or the like for instance, which is interposed or otherwise interconnected between the fluid tub flange and inner circumferential surface 47a of the yoke section; however, for the sake of drawing simplification and brevity of disclosure, the securement of the mounting device with the yoke section of the ECM and the fluid tub flange is omitted. When yoke section 35 of ECM 31 is mounted to flange 227 of fluid tub 219, printed cirucit board 91 secured to the yoke section is disposed in adjacent spaced relation from base wall 221 of fluid tub 219. It is contemplated that mounting device or plate 281 may be formed from a metallic material, such as aluminum or the like for instance, having not only the desired mechanical strength but also having good heat transfer characteristics thereby to define a heat sink for a hybrid power package 283 of solid state components which may, if desired, be disposed in mounting relation on the mounting device. Furthermore, in order to enhance the aforementioned heat transfer characteristics of mounting device 281, at least some of the surfaces thereof may be serrated, as indicated at 285. A coupling or coupling means 287 is secured by suitable means, such as press-fitting or keying or the like for instance, to shaft 255 at least generally adjacent a lower end or end portion 289 thereof, and outer circumferential surface 115 on rotor 103 of ECM 31 is connected in driving engagement with coupling 287 by suitable means, such as a spider or other driving member 291 or the like for instance. Thus, coupling 287 and driving member 291 comprise a means for rotatably driving shaft 255 from rotor 103 of ECM 31. It may be noted that the component parts of apparatus 211 are arranged generally concentrically about a centerline axis 293 of the apparatus which, of course, is believed to enhance the stability and the balance of the apparatus. Furthermore, to complete the description of apparatus 211, it may also be noted that some component parts of the apparatus and ECM 31 are shared. For instance, flange 227 on fluid tub 219 serves as a mounting housing for ECM 31, bearing means 241, 257 not only rotatably support spinning means 215 and agitating means 217 but also permanent magnet rotor means 101 of ECM 31, and shaft 255 of the agitating means also serves as a shaft for rotatably supporting the permanent magnet rotor means. While the configurations and associations of the component parts of apparatus 211, as discussed above, are illustrated herein merely for the purposes of disclosure, it is contemplated that such apparatus may be provided with component parts having various other configurations and associated with each other in various different manners.

To effect the operation of apparatus 211 in its laundering mode, assume that tap changing relays 201C, 201D, 201E are made with tap terminals 205C, 205D, 205E connecting concentrated windings 67-1 to 67-8 in concentrated winding stages C, D, E in circuit relation between end terminals 197C, 197D, 197E and common end terminal 199 thereof so as to place ECM 31 in condition for operation in its low speed-high torque mode. When concentrated winding stages C, D, E are electronically commutated in one preselected sequence to effect the operation of ECM 31 in its low speed-high torque mode, as best seen in FIGS. 22 and 29 and as discussed in greater detail hereinafter, permanent magnet rotor means 101 is rotatably driven with oscillatory motion through the selective magnetic coupling relation thereof with the electronically commutated concentrated winding stages, and such oscillatory motion is transmitted from the permanent magnet rotor means through spider 291 and coupling 287 to shaft 255 and therefrom to agitator 261. This oscillatory motion, i.e., in clockwise and counterclockwise directions, so transferred to agitator 261 effects the complementary oscillatory or agitating movement thereof on bearing means 257 relative to tubular sleeve 237 and spin tub 235 thereby to agitate and effect the laundering of fabrics received within the spin tub in fluid received in chamber 225 of fluid tub 219 and passed through apertures 253 in the spin tub thereinto. Of course, sleeve housing 271 of clutch 267 on agitator shaft 255 is conjointly rotatable therewith; however, the angular velocity of the oscillatory movement of the agitator shaft in response to the low speed-high torque mode operation of ECM 31 is predeterminately less than the aforementioned preselected value necessary to effect the pivotal displacement of clutch pivot arm 275 from its at-rest position into its pivotally displaced position, as illustrated in dotted outline in FIG. 25, for driving engagement with abutment 269 on tubular sleeve 237. Thus, since pivot arm 275 of clutch 267 remains disengaged from its cooperating abutment 269 on tubular sleeve 237, it may be noted that agitating means 217 is operable or oscillatable independently of spinning means 215 during the operation of apparatus 211 in the laundering mode thereof. At the end of laundering mode operation of apparatus 211, pump 231 may be selectively actuated to effect drainage of the laundering fluid from chamber 225 of fluid tub 219 through conduit 233.

Subsequent to the operation of apparatus 211 in its laundering mode, the apparatus may be operated in its spin mode. To effect the operation of apparatus 211 in its spin mode, assume that tap changing relays 201C, 201D, 201E are made with tap terminals 203C, 203D, 203E connecting tapped sections 195C, 195D, 195E of concentrated winding stages in circuit relation between end terminals 197C, 197D, 197E and common end terminal 199 thereof so as to place ECM 31 in condition for operation in its high speed-low torque mode. When tapped sections 195C, 195D, 195E of concentrated winding stages C, D, E are electronically commutated in another preselected sequence to effect the operation of ECM 31 in its high speed-low torque mode, as discussed in greater detail hereinafter, permanent magnet rotor means 101 is rotatably driven in one direction, i.e., either clockwise or counterclockwise, through the selective magnetic coupling relation thereof with the electronically commutated concentrated winding stages, and such rotational movement is transmitted from the permanent magnet rotor means through spider 291 and coupling 287 to agitator shaft 255 and agitator 261. Sleeve housing 271 of clutch 267 on agitator shaft 255 is, of course, conjointly rotatable therewith, and the angular velocity or speed of the rotational movement of the agitator shaft in response to the high speed-low torque mode operation of ECM 31 is predeterminately greater than the aforementioned preselected value necessary to effect the pivotal displacement of clutch pivot arm 275 from its at-rest position to the pivotally displaced position thereof, as illustrated in dotted outline in FIG. 25. Thus, upon the pivotal displacement of pivot arm 275 about its pivot pin 277 generally radially outwardly of sleeve housing 271 within vertical groove 273 toward the pivotally displaced position of the pivot arm, a part of the pivot arm becomes engaged or abuts with abutment 269 mounted to tubular sleeve 237 within opening 239 thereof. When pivot arm 275 is pivotally displaced into driving engagement with abutment 269, clutch 267 is, of course, actuated thereby to effect the conjoint rotation with agitator shaft 255 and agitator 261 of spin tub 235 and tubular sleeve 237 on bearing means 241. This conjoint rotation of shaft 255, agitator 261, tubular sleeve 237 and spin tub 235 effected by the actuation of clutch 267 in response to the high speed-low torque operation of ECM 31 results in the spinning of the fabrics within the spin tub thereby to effect centrifugal displacement of fluid from the fabrics. Of course, the centrifugally displaced fluid passes from spin tub 235 through apertures 253 therein into chamber 225 of fluid tub 219, and pump 231 is operable to drain such centrifugally displaced fluid from the spin tub chamber through conduit 233. Thus, it may be noted that during the operation of apparatus 211 in its spin mode, spinning means 215 and agitating means 217 are conjointly operable through the action of clutch 267 in response to the high speed-low torque mode operation of ECM 31. While only the laundering and spin mode operations of apparatus 211 have been discussed hereinabove for purposes of disclosure, it is contemplated that such apparatus may also be operated in various other modes.

Figure 27:
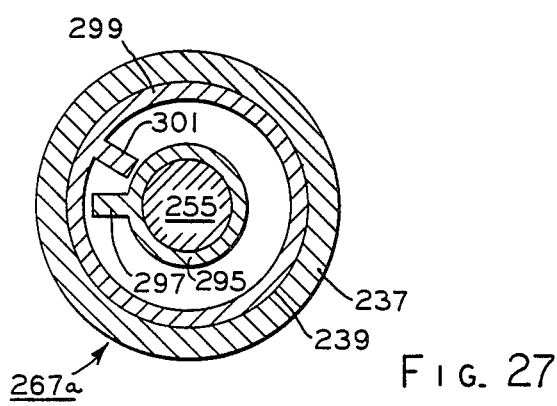
FIG. 27 is a partial sectional view illustrating an alternative driving interconnection between agitating means and spinning means for the apparatus of FIG. 24.

An alternative clutch means 267a is illustrated in FIG. 27 for use in apparatus 211. Clutch 267a comprises an inner ring 295 of suitable material secured by suitable means such as press-fitting or the like for instance, about agitator shaft 255, and an abutment or finger 297 integral with the ring extends outwardly therefrom toward opening 239 in tubular sleeve 237. Clutch 267a also has an outer ring 299 of suitable material secured by suitable means, such as press-fitting or the like for instance, within opening 239 in tubular sleeve 237 so as to extend generally circumferentially about inner ring 295 secured to agitator shaft 255, and another abutment or finger 301 integral with the outer ring extends generally inwardly therefrom toward the agitator shaft. During the laundering mode operation of apparatus 211, the oscillatory movement of inner ring 295 with agitator shaft 255 is such that abutment 297 on the inner ring either remains in spaced apart relation from abutment 301 on outer ring 299 or gently nudges it. However, during the spin mode operation of apparatus 217, the unidirectional rotation of inner ring 295 with agitator shaft 255 effects abutting engagement of abutment 297 on the inner ring with abutment 301 on outer ring 299, and in response to this engagement between abutments 297, 301, tubular sleeve 237 is conjointly rotatable with agitator shaft 255.

Figure 28:
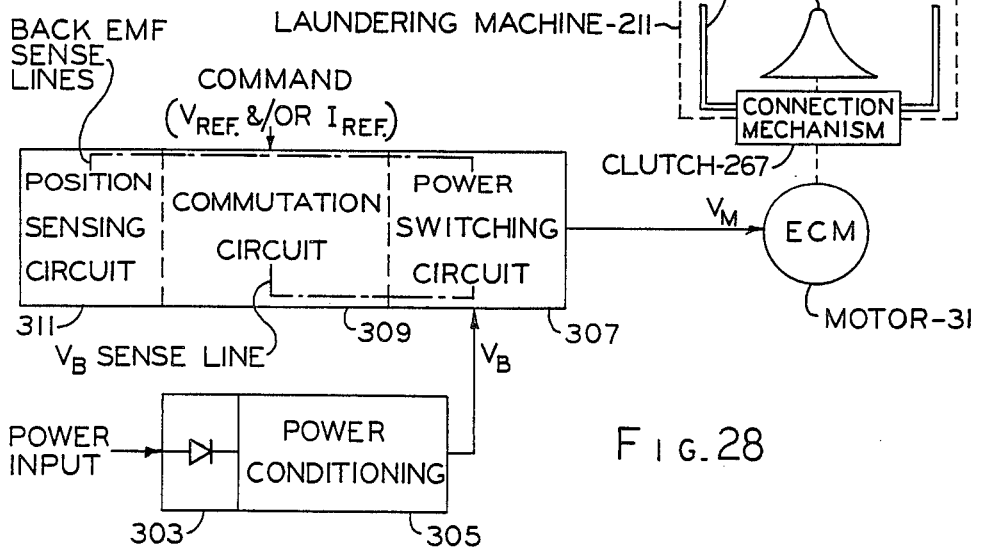
FIG. 28 is a schematic illustration of the apparatus of FIG. 24 and an exemplary drive therefor.

In FIGS. 28 and 29, there is shown an exemplary drive for apparatus 211 to effect its operation in the laundering and spin modes and an exemplary control or circuit for controlling the electronic commutation of ECM 31 in the low speed-high torque mode and the high speed-low torque mode thereof. Power supplied from either a 115 volt or a 220 volt 60 Hz. line is rectified by a rectifier circuit 303 which defines a DC power source and applied to a power conditioning circuit 305 which provides a rectified and filtered DC voltage $V_B$ to be applied to a power switching circuit 307. The operation of circuit 307 is controlled from a commutation circuit 309 so that the effective voltage $V_B$ is applied to winding stages C, D, E of ECM 31 in preselected sequences. The above discussed motion or rotation of agitator 261 and spin tub 235 is thus controlled by the applied command signals as well as by the action of commutation circuit 309. A position sensing circuit 311 provides signals indicative of the position permanent magnet rotor means 101 in ECM 31 for electrically commutating winding stages C, D, E thereof in a manner well known in the art.

FIG. 29 shows the basic components of an exemplary control circuit or system for operating ECM 31 and laundry machine 211. Full wave bridge rectifier circuit 303 having its input nodes supplied with AC power provides full wave rectified AC power to lines 313, 315. The rectified AC carried by lines 313, 315 is smoothed and filtered by a capacitor 319 thereby providing a filtered DC voltage to power switching circuit 307 which controls the application of power to winding stages C, D, E of ECM 31. A current limiting thermistor 317 connected in series circuit arrangement between an output node of bridge rectifier 303 and line 313 provides protection for power switching circuit 307 in the event of an overcurrent condition.

Power switching circuit 307 is adapted to reflect a relatively high power factor to the AC line. As shown, winding stages C, D, E are connected in a full bridge arrangement which offers certain advantages over a half bridge connection. In the half bridge connection, the winding current flows through a single winding only. In the full bridge connection of FIG. 29, common terminal 199 of each of the winding stages is connected to a point common to all three winding stages. Each of the other end terminals 197C, 197D, 197E of winding stages C, D, E are each connected through corresponding sections of a braking relay 323 to separate junction points 325, 327 and 329, respectively, which join respective pairs of commutation transistors 331A, 331B; 333A, 333B; and 335A, 335B, respectively. Each transistor pair is connected in series across lines 313, 315 and each transistor base is connected to receive a signal from commutation circuit 309. The commutation signals applied to the commutation transistors are generated by commutation circuit 309 in response to position signals provided by position sensing circuit 311 which is connected to receive back EMF signals $V_C$, $V_D$, and $V_E$.

Each of commutation transistors 331A, 331B, 333A, 333B, 335A and 335B has a diode connected thereacross, designated 337A, 337B, 339A, 339B, 341A and 341B, respectively. The purpose of these diodes is to provide alternate current paths for inductive current through winding stages C, D, E when the commutating transistors become nonconductive. When the transistors are commutated, the inductive reactance of winding stages C, D, E will tend to force current to continue to pass through the winding stages after the transistors have been commutated. Accordingly, the diodes provide a current path for the inductive current subsequent to commutation. The inductive current in winding stages C, D, E may also be effected by gating into conduction of other transistors in the full bridge arrangement.

Braking relay 323 switches between a first position in which winding stages C, D, E are coupled respectively to junction points 325, 327, 329 for operating ECM 31 in a power mode and a position in which the winding stages are short circuited on themselves. In this latter position, the inductive current in winding stages C, D, E is short circuited such that the current forces a braking action of ECM 31. This type of braking action is well known in the motor art and is commonly referred to as "plug braking". In plug braking, the energy of the system to which the motor is connected is returned to the motor windings by creating a current in the windings so that the motor acts as a generator and the generated current is thermally dissipated within the motor windings.

Tap changing relay 201 allows each of winding stages C, D, E to be switched from a first position in which each of concentrated windings 67-1 to 67-8 of each winding stage are serially connected to provide the low speed-high torque operational mode of ECM 31 and a second position in which only tapped sections 195C, 195D, 195E of each winding stage are coupled to power switching circuit 307 which provides the high speed-low torque operational mode of the ECM. The low speed-high torque position occurs when switches 201C, 201D, 201E are to terminals 205C, 205D, 205E and is utilized in the laundering mode operation of laundering machine 211 is previously descissed. When switches 201C, 201D, 201E are coupled to tap 203C, 203D, 203E only tapped sections 195C, 195D, 195E are included in the motor power circuit resulting in the high speed-low torque mode operation of ECM 31, and this position is utilized in the spin mode operation of the laundering machine as previously mentioned.

Although power switching circuit 307 has been illustrated as using standard transistors, it will be appreciated that the transistors may alternatively be either field effect transistors (FET) or insulated gate transistors (IGT) with drive circuits appropriate to each located in commutation circuit 309. The construction and arrangement of the commutation circuit 309 is detailed in U.S. Pat. No. 4,449,079 issued May 15, 1984 which is incorporated herein by reference. Commutation circuit 309 is controlled in response to a voltage reference signal $V_{ref}$ supplied from a voltage reference source 343 and by a current reference signal $I_{ref}$ supplied by a current reference source 345. The current reference $I_{ref}$ is a peak current setting established by the manufacturer for constraining the maximum power output of power switching circuit 307. A current sensing shunt 347 provides a current sense signal which is compared to the current reference signal in order to generate an error signal for use in commutation circuit 309. The use of the current reference signal and current sense signal for developing current control gating signals for switching transistors 331A, 331B, 333A, 333B, 335A, 335B in power switching circuit 307 is well known in the art and will not be described herein.

Voltage reference source 343 represents information derived from a microcomputer (not shown) or other control device which provides voltage wave forms for controlling the commutation of transistors 331A, 331B, 333A, 333B, 335A, 335B within power switching circuit 307 in such a manner as to create the agitate and spin motion profiles of laundering machine 211. The $V_{ref}$ signal is compared with a motor voltage $V_m$ to obtain an error signal for controlling the switching transistors. The motor voltage $V_m$ is derived from a voltage divider comprising first and second serially connected resistors 349 and 351 connected between voltage buses 313, 315. The voltage intermediate resistors 349, 351 is a voltage directly proportional to the voltage $V_m$ on ECM 31.

If a more detailed discussion of the operation of the exemplary drive or control for an ECM operable in a low speed-high torque and high speed-low torque mode is desired, reference may be had to the aforementioned U.S. Pat. No. 4,528,485 issued July 9, 1985. For a more detailed discussion of the operation of commutation circuit 309 in response to voltage reference source 343 and current reference source 345, reference may be had to the aforementioned U.S. Pat. No. 4,449,079.

From the foregoing, it is now apparent that a novel salient pole electronically commutated motor and a novel salient pole core have been disclosed for accomplishing the objects set forth hereinabove, as well as others, and that changes as to the precise arrangements, shapes, details and connections of the component parts of such salient pole electronically commutated motor and salient pole core may be made by those having ordinary skill in the art without departing from the spirit of the invention or from the scope thereof as set out in the following claims.

What we claim as new and desire to secure by Letters Patent of the United States is:

1. A salient pole stator core for a dynamoelectric machine having a plurality of concentrated windings comprising:

an edgewise wound yoke including a lanced strip of generally thin ferromagnetic material having a pair of generally opposite edges and being edgewise wound into a plurality of generally helical convolutions arranged in a generally annular stack thereby to define said edgewise wound yoke, a pair of opposite end portions on said wound lanced strip defining a pair of first opposite end faces on said edgewise wound yoke, said opposite edges defining generally radially spaced apart outer and inner circumferential surface extending a preselected axial length across said edgewise wound yoke between said first opposite end faces, and a plurality of spaced apart notches in one of said opposite edges and aligned in a plurality of notch rows extending generally axially across said outer circumferential surface between said first opposite end faces, respectively;

a set of salient pole means for respectively receiving the concentrated windings and arranged on a set of preselected pitch axes so as to extend generally radially outwardly from said outer circumferential surface, said salient pole piece means each including a plurality of lanced laminations of a generally thin ferromagnetic material with said lanced laminations being secured together generally in face-to-face relation in a stack thereof, a pair of second opposite end faces on said lanced lamination stack and arranged at least generally in planar relation with said first opposite end faces, an intermediate winding receiving section on said lanced lamination stack interposed between a generally arcuate tip section and a base section thereof, said tip section extending generally radially beyond said intermediate section in spaced apart relation with said outer circumferential surface and said base section being arranged in engagement with said outer circumferential surface at least generally adjacent a respective one of said notch rows, and extension means on said base section and received in said respective one notch row in displacement preventing engagement therewith for retaining said each salient pole piece means against displacement from said edgewise wound yoke, said intermediate, tip and base sections and said extension means extending between said second opposite end faces, respectively;

means disposed at least in part within said notch rows and engaged between said extension means and said edgewise wound yoke for retaining said extension means in the displacement preventing engagement thereof with said notch rows, respectively; and a set of winding receiving slots extending across the preselected axial length of said edgewise wound core and defined between said outer circumferential surface and adjacent ones of said salient pole piece means, and each of said slots including an open end extending between said tip sections of said adjacent ones of said salient pole piece means, respectively.

2. A salient pole core for a dynamoelectric machine comprising:

an edgewise wound yoke including a lanced strip of generally thin ferromagnetic material edgewise and helically wound into a plurality of helical convolutions arranged generally in aligned relation in a generally loose wound annular stack defining said edgewise wound yoke, at least one edge on said wound lanced strip having a plurality of spaced apart notches therein with said at least one edge defining an outer circumferential surface on said edgewise wound yoke and with said notches extending in a plurality of rows thereof generally axially across said outer circumferential surface, respectively; and a set of salient pole pieces extending on a set of preselected pitch axes generally outwardly from said outer circumferential surface and said salient pole pieces including a set of extension means received in said notch rows for retaining said salient pole pieces against displacement from said edgewise wound yoke and for retaining said helical convolutions against displacement from their aligned relation in said annular stack, respectively.

3. A salient pole core for a dynamoelectric machine comprising:

an edgewise wound yoke including a lanced strip of generally thin ferromagnetic material edgewise and helically wound into a plurality of helical convolutions arranged generally in aligned relation in a generally loose wound annular stack defining said edgewise wound yoke, at least one edge on said wound lanced strip having a plurality of spaced apart extensions thereon with said at least one edge defining an outer circumferential surface on said edgewise wound yoke and with said extensions extending in a plurality of extension rows generally axially across said outer circumferential surface, respectively; and a set of salient pole pieces extending on a set of preselected pitch axes generally outwardly from said outer circumferential surface on said edgewise wound yoke, and said salient pole pieces including a set of notch means receiving said extension rows on said outer circumferential surface of said edgewise wound yoke in displacement preventing engagement for retaining said salient poles against displacement from said edgewise wound yoke and for retaining said helical convolutions against displacement from their aligned relation in said annular stack, respectively.

4. A salient pole core for a dynamoelectric machine comprising:
  an edgewise wound yoke including an edgewise and helically wound lanced strip of generally thin ferromagnetic material arranged generally in aligned relation in a generally annular stack and having at least one edge defining an outer circumferential surface on said edgewise wound yoke, and extending generally axially thereacross;
  a set of salient pole pieces extending about a set of preselected pitch axes generally outwardly from said circumferential surface on said edgewise wound yoke respectively; and
  said edgewise wound yoke and said salient pole pieces including a pair of sets of means associated in displacement preventing engagement for retaining said salient pole pieces against displacement from said edgewise wound yoke and for retaining said edgewise and helically wound lanced strip against displacement from the aligned relation thereof in said annular stack, respectively.

5. A salient pole core as set forth in claim 4 wherein said retaining means of one of said retaining means sets comprise a set of groove means in said outer circumferential surface extending generally axially across said edgewise wound yoke for receiving in the displacement preventing engagement said retaining means of the other of said retaining means sets on said salient pole pieces, and said groove means being defined by a plurality of notches in said at least one edge of said wound lanced strip arranged generally in a plurality of rows thereof generally axially across said edgewise wound yoke, respectively.

6. A salient pole core as set forth in claim 5 wherein said retaining means of said other retaining means includes a set of extension means on said salient pole pieces for reception in said groove means of said edgewise wound yoke in the displacement preventing engagement therewith, respectively.

7. A salient pole core as set forth in claim 4 wherein said retaining means of one of said retaining means sets comprises a set of groove means in said salient pole pieces for receiving in the displacement preventing engagement said retaining means of the other of said retaining means sets on said edgewise wound yoke, respectively.

8. A salient pole core as set forth in claim 7 wherein said retaining means of said other retaining means set includes a set of extension means extending generally radially outwardly from said outer circumferential surface on said edgewise wound yoke and generally axially thereacross for reception in the displacement preventing engagement within said groove means in said salient pole pieces, and said extension means being defined by a plurality of spaced apart projections extending from said at least one edge on said wound lanced strip and arranged generally in a plurality of rows thereof generally axially across said edgewise wound core, respectively.

9. A salient pole core as set forth in claim 4 further comprising a set of wedge means for association in engagement between said retaining means of said pair of sets thereof, respectively.

10. A salient pole core for a dynamoelectric machine comprising:
  an edgewise wound yoke including an edgewise and helically wound strip of generally thin ferromagnetic material arranged generally in aligned relation in a generally annular stack and having at least one edge defining an outer circumferential surface on said edgewise wound yoke and extending generally axially thereacross; and
  a set of salient pole pieces secured in displacement preventing engagement to said edgewise wound yoke at least generally adjacent its outer circumferential surface so as to retain said wound strip against displacement from said annular stack and extending generally outwardly from said outer circumferential surface about a set of preselected pitch axes, respectively.

11. A salient pole core as set forth in claim 10 further comprising a hardenable adhesive means disposed between said salient pole pieces and said outer circumferential surface on said edgewise wound yoke for effecting the securement thereto of said salient pole pieces, respectively.

12. A salient pole core as set forth in claim 10 wherein each of said salient pole pieces comprises a plurality of lanced laminations of generally thin ferromagnetic material with said lanced laminations being secured together generally in interfacing relation in a stack thereof, respectively.

13. A salient pole core as set forth in claim 10 wherein said edgewise wound yoke and said salient pole pieces each include a pair of opposite end faces arranged generally in parallel relation with each other and with said outer circumferential surface on said edgewise wound yoke extending generally axially between said opposite end faces thereof, respectively.

14. A salient pole core as set forth in claim 10 wherein said salient pole pieces include a set of generally arcuate tip sections arranged generally in radially spaced apart relation with said outer circumferential surface on said edgewise wound yoke, respectively.

15. A salient pole core as set forth in claim 10 wherein said edgewise wound yoke further includes another edge on said wound strip generally opposite said at least one edge thereof and defining an inner circumferential surface extending generally axially across said edgewise wound yoke in radially spaced apart relation with said outer circumferential surface thereof.

16. A salient pole core as set forth in claim 10 further comprising a set of extensions on one of said salient pole pieces and said outer circumferential surface of said edgewise wound core, and a set of groove means in the other of said salient pole pieces and said outer circumferential surface of said edgewise wound core for receiving in displacement preventing engagement said extensions thereby to effect the securement of said salient pole pieces to said edgewise wound yoke, respectively.

17. A salient pole core as set forth in claim 16 further comprising a set of means for wedging in engagement between said extensions and said groove means, respectively.

18. A salient pole core for a dynamoelectric machine comprising:
  an edgewise wound yoke including a plurality of edgewise and helically wound convolutions of a lanced strip of a generally thin ferromagnetic material arranged generally in aligned relation in a generally loose wound annular stack defining said yoke, said yoke having an outer circumferential surface extending generally axially thereacross; and a set of salient pole pieces extending on a set of preselected pitch axes generally outwardly from said outer circumferential surface on said edgewise wound yoke, each of said salient pole pieces including a plurality of lanced laminations of generally thin ferromagnetic material arranged generally in a stack thereof and secured together in interfacing relation, an intermediate winding receiving section on said lanced lamination stack interposed between a generally arcuate tip section and a base section thereof, said arcuate tip section of said lanced lamination stack being arranged generally in radially spaced relation with said outer circumferential surface on said edgewise wound yoke, and said base section being secured in displacement preventing engagement to said edgewise wound yoke at least generally adjacent said outer circumferential surface to retain said helical convolutions against displacement from their aligned relation in the annular stack, respectively.

19. A salient pole electronically commutated motor comprising:

an edgewise wound yoke including a first lanced strip of generally thin ferromagnetic material having a pair of first generally opposite edges and being edgewise wound into a plurality of first generally helical convolutions thereof arranged in a first generally annular stack thereby to define said edgewise wound yoke, a pair of first opposite end portions on said first wound lanced strip defining a pair of first opposite end faces on said edgewise wound yoke, said first opposite edges on said first wound lanced strip defining generally radially spaced apart first outer and inner circumferential surfaces extending a preselected axial length across said edgewise wound yoke between said first opposite end faces thereon, and a plurality of first spaced apart notches in one of said first opposite edges of said first wound lanced strip and aligned in a plurality of first rows thereof extending generally axially across said first outer circumferential surface of said edgewise wound yoke between said first opposite end faces thereof, respectively;

a set of salient pole pieces arranged on a set of preselected pitch axes therefor about said first outer circumferential surface on said edgewise wound yoke, said salient pole pieces each including a plurality of lanced laminations of generally thin ferromagnetic material with said lanced laminations being secured together generally in face-to-face relation in a stack thereof, a pair of second opposite end faces on said lanced lamination stack and arranged at least generally coextensively with said first opposite end faces on said edgewise wound yoke, an intermediate section on said lamination stack interposed between a generally arcuate tip section and a base section thereof, said tip section extending generally radially beyond said intermediate section in spaced apart relation with said first outer circumferential surface on said edgewise wound yoke and said base section being arranged in engagement with said first outer circumferential surface at least generally adjacent a respective one of said first notch rows therein, and extension means on said base section and received in said respective one first notch row in displacement preventing engagement therewith for retaining said each salient pole piece against displacement from said edgewise wound yoke, said intermediate, tip and base sections and said extension means extending between said second opposite end faces on said each salient pole piece, respectively;

a set of means disposed at least in part within said first notch rows and engaged between said extension means on said salient pole pieces and edgewise wound yoke for retaining said extension means on said salient pole pieces in the displacement preventing engagement thereof with said first notch rows in said first outer circumferential surface of said edgewise wound yoke, respectively;

a set of winding stage receiving slots extending across the preselected axial length of said edgewise wound core and defined between said first outer circumferential surface thereon and adjacent ones of said salient pole pieces, and each of said slots including an open end extending between said tip sections of said adjacent ones of said salient pole pieces, respectively;

a multistage winding arrangement associated with said salient pole pieces and including a set of concentrated winding stages adapted to be electronically commutated in at least one preselected sequence, respectively, each of said concentrated winding stages being disposed about said intermediate section of respective ones of said lanced lamination stacks between said tip section and base section thereof so as to extend through adjacent ones of said slots, and said each concentrated winding stage comprising an insulated conductor with at least one conductor turn thereof disposed about said intermediate section of said respective ones of said lanced lamination stacks;

a set of means for insulating said salient pole pieces and parts adjacent thereto of said outer circumferential surface on said yoke from said concentrated winding stages, respectively; and an edgewise wound rotor including a second lanced strip of generally thin ferromagnetic material having a pair of second generally opposite edges and being edgewise wound into a plurality of second generally helical convolutions thereof arranged in a second generally annular stack thereby to define said edgewise wound rotor, a pair of second opposite end portions on said second wound lanced strip defining a pair of third opposite end faces on said edgewise wound rotor, said second opposite edges on said second wound lanced strip defining generally radially spaced apart second outer and inner circumferential surfaces extending a preselected axial length across said edgewise wound rotor between said third opposite end faces thereon and with said second inner circumferential surface extending generally circumferentially about said tip sections of said salient pole pieces on said edgewise wound yoke, and a plurality of second spaced apart notches in one of said second opposite edges of said second wound lanced strip and aligned in a plurality of second rows thereof extending generally axially across said second inner circumferential surface of said edgewise wound rotor between said third opposite end faces thereof, respectively; and a set of permanent magnet material elements disposed at least in part within said second spaced apart notches in said second inner circumferential surface on said edgewise wound rotor and secured thereto against displacement, said edgewise wound rotor and said permanent magnet material elements being associated in selective magnetic coupling relation with said concentrated winding stages so as to be conjointly rotatably driven thereby upon the electronic commutation of at least some of said concentrated winding stages in the at least one preselected sequence, respectively.

20. A salient pole electronically commutated motor comprising:

a generally annular edgewise wound yoke including a plurality of first generally helical convolutions of a first edgewise deformed lanced strip of generally thin ferromagnetic material having a pair of first generally opposite edges thereon defining first outer and inner circumferential surfaces on the yoke section extending generally axially thereacross, respectively;

a set of salient pole pieces disposed on a set of preselected pitch axes therefor generally about said first outer circumferential surface on said yoke so as to extend generally outwardly therefrom, respectively, each of said salient pole pieces including a plurality of lanced laminations of a generally thin ferromagnetic material secured together in a stack thereof, an intermediate section on said lanced lamination stack, a base section on said lanced lamination stack integral with said intermediate section thereof and engaged with said first outer circumferential surface, a generally arcuate tip section integral with said intermediate section and spaced from said base section, and a pair of opposite tip ends on said tip section extending beyond said intermediate section in spaced apart relation with said first outer circumferential surface on said yoke section, respectively;

a multistage winding arrangement associated with said salient pole pieces including a set of concentrated winding stages adapted to be electronically commutated in at least one preselected sequence, said concentrated winding stages comprising a set of insulated conductors having at least one conductor turn thereof disposed about said intermediate sections on said lanced lamination stack of said salient pole pieces, respectively;

a generally annular edgewise wound rotor including plurality of second generally helical convolutions of a second edgewise deformed lanced strip of generally thin ferromagnetic material having a pair of second opposite edges thereon defining second outer and inner circumferential surfaces on the rotor extending generally axially thereacross, respectively, said second inner circumferential surface on said rotor being arranged generally in radially spaced apart relation with said tip sections of said salient pole pieces and said first outer circumferential surface on said yoke; and a set of permanent magnet material elements secured to said rotor at least generally adjacent said second inner circumferential surface thereof and arranged in generally arcuately spaced relation with respect to each other about said second inner circumferential surface, respectively, said permanent magnet material elements and said rotor being associated in selective magnetic coupling relation with said concentrated winding stages so as to be conjointly rotatably driven thereby upon the electronic commutation of at least some of said concentrated winding stages in the at least one preselected sequence, respectively.

21. A salient pole electronically commutated motor comprising:

an edgewise wound yoke including a lanced strip of generally thin ferromagnetic material edgewise and helically wound into a plurality of helical convolutions arranged in a generally annular stack thereof defining said edgewise wound yoke, at least one edge on said wound lanced strip having a plurality of spaced apart notches therein with said at least one edge defining an outer circumferential surface on said edgewise wound yoke and with said notches extending in a plurality of rows thereof generally axially across said outer circumferential surface, respectively;

a set of salient pole pieces extending on a set of preselected pitch axes therefor generally about said outer circumferential surface on said edgewise wound yoke, and said salient pole pieces including a set of extension means received in said notch rows in said outer circumferential surface on said edgewise wound yoke in displacement preventing engagement therewith for retaining said salient pole pieces against displacement from said edgewise wound yoke, respectively;

a multistage winding arrangement associated with said salient pole pieces and including a set of concentrated winding stages disposed about at least respective ones of said salient pole pieces and adapted to be electronically commutated in at least one preselected sequence, respectively; and permanent magnet rotor means arranged generally circumferentially about said salient pole pieces and associated in selective magnetic coupling relation with said concentrated winding stages for driven rotation in response to the electronic commutation of at least some of said concentrated winding stages in the at least one preselected sequence, respectively.

22. A salient pole core for a dynamoelectric machine comprising:

an edgewise wound yoke including a lanced strip of generally thin ferromagnetic material edgewise and helically wound into a plurality of helical convolutions arranged in a generally annular stack thereof defining said edgewise wound yoke, at least one edge on said wound lanced strip having a plurality of spaced apart extensions thereon with said at least one edge defining an outer circumferential surface on said edgewise wound yoke and with said extensions extending in a plurality of rows thereof generally axially across said outer circumferential surface, respectively;

a set of salient pole pieces extending on a set of preselected pitch axes therefor generally about said outer circumferential surface on said edgewise wound yoke, and said salient pole pieces including a set of notch means receiving said extension rows on said outer circumferential surface of said edgewise wound yoke in displacement preventing engagement for retaining said salient pole pieces against displacement from said edgewise wound yoke, respectively;

a multistage winding arrangement associated with said salient pole pieces and including a set of concentrated winding stages disposed about at least respective ones of said salient pole pieces and adapted to be electronically commutated in at least one preselected sequence, respectively; and permanent magnet rotor means rotatably arranged generally circumferentially about said salient pole pieces and associated in selective magnetic coupling relation with said concentrated winding stages for driven rotation in response to the elctronic commutation of at least some of said concentrated winding stages in the at least one preselected sequence, respectively.

23. A salient pole electronically commutated motor comprising:
an edgewise wound yoke including an edgewise and helically wound lanced strip of generally thin ferromagnetic material having at least one edge defining an outer circumferential surface on said edgewise wound yoke and extending generally axially thereacross;
a set of salient pole pieces extending about a set of preselected pitch axes generally outwardly from said circumferential surface on said edgewise wound core, respectively;
said edgewise wound yoke and said salient pole pieces including a pair of sets of means associated in displacement preventing engagement for retaining said salient pole pieces against displacement from said edgewise wound yoke and for retaining said wound lanced strip against displacement in said edgewise wound yoke, respectively;
a multistage winding arrangement with said salient pole pieces and including a set of concentrated winding stages disposed about at least respective ones of said salient pole pieces and adapted to be electronically commutated in at least one preselected sequence, respectively; and
permanent magnet rotor means arranged generally circumferentially about said salient pole pieces and associated in selective magnetic coupling relation with said concentrated winding stages for driven rotation in response to the electronic commutation of at least some of said concentrated winding stages in the at least one preselected sequence, respectively.

24. A salient pole electronically commutated motor as set forth in claim 23 wherein said retaining means of one of said retaining means sets comprise a set of groove means in said outer circumferential surface extending generally axially across said edgewise wound yoke for receiving in the displacement preventing engagement said retaining mean of the other of said retaining means set on said salient pole pieces, and said groove means being defined by a plurality of notches in said at least one edge of said wound lanced strip arranged generally in a plurality of rows thereof generally axially across said edgewise wound yoke, respectively.

25. A salient pole electronically commutated motor as set forth in claim 24 wherein said retaining means of said other retaining means includes a set of extension means on said salient pole pieces for reception in said groove means of said edgewise wound yoke in the displacement preventing engagement therewith, respectively.

26. A salient pole electronically commutated motor as set forth in claim 23 wherein said retaining means of one of said retaining means sets comprise a set of groove means in said salient pole pieces for receiving in the displacement preventing engagement said retaining means of the other of said retaining means sets on said edgewise wound yoke, respectively.

27. A salient pole electronically commutated motor as set forth in claim 26 wherein said retaining means of said other retaining means set includes a set of extension means extending generally outwardly from said outer circumferential surface on said edgewise wound yoke and generally axially thereacross for reception in the displacement preventing engagement within said groove means in said salient pole pieces, and said extension means being defined by a plurality of spaced apart projections extending from said at least one edge on said wound lanced strip and arranged generally in a plurality of rows thereof generally axially across said edgewise wound core, respectively.

28. A salient pole electronically commutated motor as set forth in claims 23, 24, 25, 26 or 27 further comprising a set of means for association in wedging engagement between said retaining means of said retaining means sets, respectively.

29. A salient pole electronically commutated motor as set forth in claim 23 wherein each of said concentrated winding stages includes an insulated conductor having at least one conductor turn thereof disposed about said at least respective ones of said salient pole pieces.

30. A salient pole electronically commutated motor as set forth in claim 29 further comprising a printed circuit board secured to said edgewise wound yoke and connected in circuit relation with said insulated conductors, respectively.

31. A salient pole electronically commutated motor comprising:
an edgewise wound yoke including an edgewise and helically wound strip of generally thin ferromagnetic material having at least one edge thereon defining an outer circumferential surface on said edgewise wound yoke and extending generally axially thereacross;
a set of salient pole pieces seated on said outer circumferential surface and secured to said edgewise wound yoke at least generally adjacent said outer circumferential surface so as to extend outwardly from said circumferential surface on a set of preselected pitch axes, respectively;
a multistage winding arrangement associated with said salient pole pieces and including a set of concentrated winding stages disposed about at least respective ones of said salient pole pieces and adapted to be electronically commutated in at least one preselected sequence, respectively; and
permanent magnet rotor means arranged generally circumferentially about said salient pole pieces and associated in selective magnetic coupling relation with said concentrated winding stages for driven rotation upon the electronic commutation of at least some of said concentrated winding stages in the at least one preselected sequence, respectively.

32. A salient pole electronically commutated motor as set forth in claim 31 wherein said permanent magnet rotor means includes an edgewise wound rotor having another edgewise and helically wound strip of generally thin ferromagnetic material with at least one edge thereon defining an inner circumferential surface on said rotor extending generally axially thereacross and generally circumferentially about said salient pole pieces, respectively.

33. A salient pole electrically commutated motor as set forth in claim 31 wherein said permanent magnet rotor means includes a set of generally arcuate segments of ferromagnetic material secured together against displacement so as to define a generally annular rotor having an inner circumferential surface extending generally axially thereacross and generally circumferentially about said salient pole pieces, respectively.

34. A salient pole electronically commutated motor as set forth in claim 32 or 33 wherein said permanent magnet rotor means further includes a set of permanent magnet material elements secured to said rotor at least generally adjacent said inner circumferential surface thereof and arranged in preselected arcuate spaced apart relation about said inner circumferential surface, respectively.

35. A salient pole electronically commutated motor as set forth in claim 31 further comprising a hardenable adhesive means disposed between said salient pole pieces and said outer circumferential surface on said edgewise wound yoke for effecting the securement thereto, of said salient pole pieces, respectively.

36. A salient pole core as set forth in claim 31 wherein each of said salient pole pieces comprises a plurality of lanced laminations of generally thin ferromagnetic material with said lanced laminations being secured together generally in interfacing relation in a stack thereof, respectively.

37. A salient pole core as set forth in claim 10 further comprising a set of extensions on one of said outer circumferential surface of said edgewise wound yoke and said salient pole pieces, and a set of groove means in the other of said outer circumferential surface of said edgewise wound yoke and said salient pole pieces for receiving in displacement preventing engagement said extensions, respectively.

38. A salient pole core as set forth in claim 37 further comprising a set of means for wedging in engagement between said extensions and said groove means, respectively.

39. A salient pole electronically commutated motor as set forth in claim 31 wherein said concentrated winding stages comprise a set of insulated conductors having at least one conductor turn thereof disposed about said salient pole pieces, respectively.

40. A salient pole electronically commutated motor as set forth in claim 39 further comprising a printed circuit board mounted to said yoke and connected in circuit relation with said insulated conductors, respectively.

* * * * *